(12) United States Patent
Azuma et al.

(10) Patent No.: US 11,400,882 B2
(45) Date of Patent: Aug. 2, 2022

(54) SIDE AIRBAG DEVICE

(71) Applicant: ASHIMORI INDUSTRY CO., LTD., Settsu (JP)

(72) Inventors: Hidetaka Azuma, Settsu (JP); Yuta Minami, Settsu (JP); Yoshitaka Okagami, Settsu (JP); Kazuya Hashimoto, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/211,935

(22) Filed: Mar. 25, 2021

(65) Prior Publication Data

US 2021/0300294 A1 Sep. 30, 2021

(30) Foreign Application Priority Data

Mar. 30, 2020 (JP) .............................. JP2020-060499

(51) Int. Cl.
*B60R 21/231* (2011.01)
*B60R 21/207* (2006.01)
*B60R 21/00* (2006.01)

(52) U.S. Cl.
CPC ...... *B60R 21/23138* (2013.01); *B60R 21/207* (2013.01); *B60R 2021/0006* (2013.01); *B60R 2021/0048* (2013.01); *B60R 2021/23146* (2013.01)

(58) Field of Classification Search
None
See application file for complete search history.

(56) References Cited

U.S. PATENT DOCUMENTS

| 8,448,981 B2* | 5/2013 | Fukawatase | B60R 21/233 |
| | | | 280/730.2 |
| 8,851,511 B1* | 10/2014 | Volkmann | B60R 21/23138 |
| | | | 280/730.2 |
| 9,994,185 B2* | 6/2018 | Deng | B60R 21/2338 |
| 10,759,374 B2* | 9/2020 | Yoo | B60R 21/23138 |

FOREIGN PATENT DOCUMENTS

| JP | 2017-514746 A | 6/2017 |
| JP | 2017-537025 A | 12/2017 |
| WO | WO 2015/168401 A1 | 11/2015 |
| WO | WO 2016/094561 A1 | 6/2016 |
| WO | WO 2019/228898 A1 | 12/2019 |

\* cited by examiner

*Primary Examiner* — Faye M Fleming
(74) *Attorney, Agent, or Firm* — Oblon, McClelland, Maier & Neustadt, L.L.P.

(57) ABSTRACT

A side airbag device includes an airbag including a first inflation portion fixed to a seat and a second inflation portion inclining toward an occupant with respect to the first inflation portion. The airbag includes an occupant side panel disposed on an occupant side, a non-occupant side panel disposed opposite the occupant side panel, and a strip connection panel connecting a peripheral edge of the occupant side panel and a peripheral edge of the non-occupant side panel. The non-occupant side panel is spaced from the occupant side panel in a vehicle width direction. The connection panel includes a bend portion between a first peripheral edge portion connected to a first part of the peripheral edge of the occupant side panel defining the first inflation portion and a second peripheral edge portion connected to a second part of the peripheral edge of the occupant side panel defining the second inflation portion, or in the second peripheral edge portion.

5 Claims, 18 Drawing Sheets

SIDE AIRBAG DEVICE

CROSS-REFERENCE TO RELATED APPLICATIONS

The present application claims priority under 35 U.S.C. § 119 to Japanese Patent Application No. 2020-060499 filed on Mar. 30, 2020, the contents of which are incorporated herein by reference in their entirety.

BACKGROUND OF THE INVENTION

Field of the Invention

The present invention relates to side airbag devices. The present invention specifically relates to a side airbag device that is inflatable and deployable in a space beside an occupant in case of a lateral collision of a vehicle such as an automobile.

Discussion of the Background

Side airbag devices are known to prevent, in case of a lateral collision of a vehicle, movement of an occupant to an inner side in a vehicle width direction and thereby to prevent contact with an occupant seated in the next seat (e.g., JP 2017-537025 T and JP 2017-514746 T).

The airbag device disclosed in JP 2017-537025 T is provided with a slit in a non-inflation portion of an airbag and a tether passing through the slit and having a length shorter than the length of the airbag in the inflated and deployed state. This structure allows an end of the airbag to bend when the airbag inflates and deploys, to restrict movement of an occupant in a diagonally forward direction. The airbag device disclosed in JP 2017-514746 T is provided with tethers each having a length shorter than the length of the airbag in the inflated and deployed state. This structure can control the shape of inflation and deployment (deployment trajectory) so as to avoid interference with a console box.

SUMMARY OF THE INVENTION

The airbag devices disclosed in JP 2017-537025 T and JP 2017-514746 T are provided with tether(s) having a length shorter than the length of the airbag in the inflated and deployed state, i.e., shorter than the length of the airbag spread on a plane without being folded and inflated, in order to deploy the airbag in a desired position such as a position diagonally in front of the head of an occupant or a position that can prevent interference with a console box. Production of such an airbag thus requires a step of mounting tether(s). Furthermore, a step of folding the airbag needs to be performed with turning part of the airbag inside out, which makes the step complicated.

The present invention has been made under the current situation in the art and aims to provide a side airbag device that has a simple structure and can allow an airbag to deploy in a desired position.

In order to solve the above problems and to achieve the aim, an aspect of the present invention relates to a side airbag device including an inflator fixed in a vehicle seat and configured to generate a gas, and an airbag that has a bag shape and is inflatable and deployable in a space beside an occupant seated in the seat in response to the gas upon activation of the inflator, the airbag in an inflated and deployed state including a first inflation portion fixed to the seat and a second inflation portion inclining toward the occupant with respect to the first inflation portion, the airbag including an occupant side panel disposed on an occupant side, a non-occupant side panel disposed opposite the occupant side panel, and a strip connection panel connecting a peripheral edge of the occupant side panel and a peripheral edge of the non-occupant side panel, the non-occupant side panel being spaced from the occupant side panel in a vehicle width direction, the connection panel including a bend portion between a first peripheral edge portion connected to a first part of the peripheral edge of the occupant side panel defining the first inflation portion and a second peripheral edge portion connected to a second part of the peripheral edge of the occupant side panel defining the second inflation portion, or in the second peripheral edge portion.

Another aspect of the present invention relates to a side airbag device including an inflator fixed in a vehicle seat and configured to generate a gas, and an airbag that has a bag shape, is inflatable and deployable in a space beside an occupant seated in the seat in response to the gas upon activation of the inflator, and includes an occupant side panel disposed on an occupant side, a non-occupant side panel disposed opposite the occupant side panel, and a strip connection panel connecting a peripheral edge of the occupant side panel and a peripheral edge of the non-occupant side panel, one or both of a vehicle front side portion and a vehicle rear side portion of the non-occupant side panel being spaced from the occupant side panel in a vehicle width direction, the connection panel being provided with a recessed portion or a protruding portion, the airbag having a change in thickness in the recessed portion or the protruding portion of the connection panel.

Unless otherwise specified, the description on the shape of an airbag herein is based on the inflated and deployed state.

The present invention can provide a side airbag device that has a simple structure and can allow an airbag to deploy in a desired position.

DESCRIPTION OF EMBODIMENTS

The directions herein are described relative to a vehicle unless otherwise mentioned. For example, the "front side" indicates a side based on the forward direction of the vehicle; the "rear side" indicates a side based on the backward direction of the vehicle; the "upper side" indicates a side based on the upward direction of the vehicle; "lower side" indicates a side based on the downward direction of the vehicle; and the "lateral side" indicates a side based on the inward direction of a vehicle width direction. The arrow FR, the arrow RE, the arrow UP, the arrow DOWN, the arrow IN, and the arrow OUT drawn in the figures as appropriate respectively indicate the forward direction of the vehicle, the rear direction of the vehicle, the upward direction of the vehicle, the downward direction of the vehicle, the inward direction of the vehicle width direction, and the outward direction of the vehicle width direction. The members placed inside a vehicle seat are illustrated in see-through figures of the vehicle seat.

Embodiment 1

Hereinafter, a side airbag device of Embodiment 1 of the present invention is described with reference to the drawings.

Figure 1:
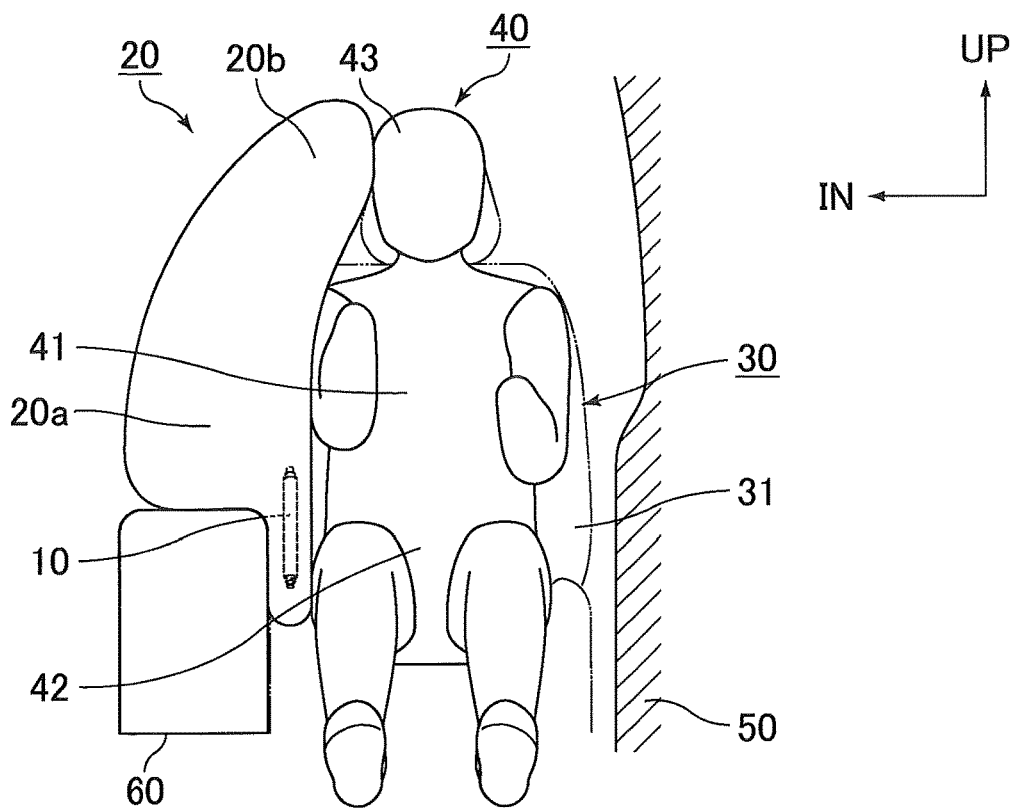
FIG. 1 is a schematic view of a side airbag device of Embodiment 1 viewed from the vehicle front side, showing a state of an occupant restrained by an airbag.
Figure 2:
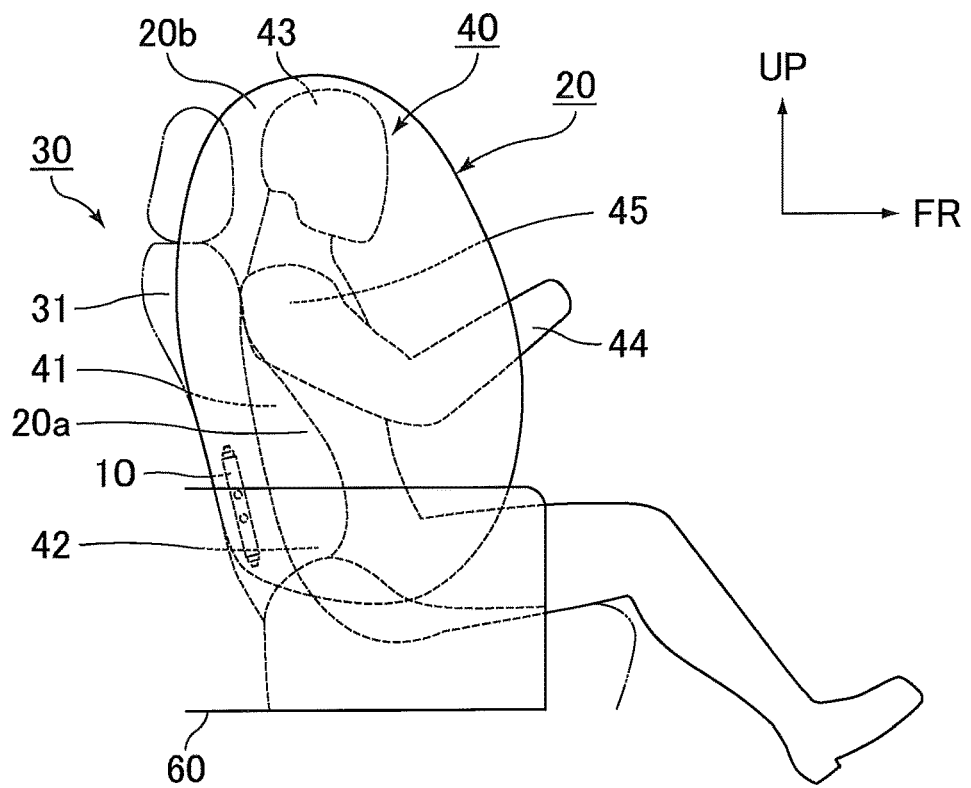
FIG. 2 is a schematic view of the side airbag device of Embodiment 1 viewed from the vehicle lateral side, showing a state of an occupant restrained by an airbag.

FIG. 1 is a schematic view of the side airbag device of Embodiment 1 viewed from the vehicle front side, showing a state of an occupant restrained by an airbag. FIG. 2 is a schematic view of the side airbag device of Embodiment 1 viewed from the vehicle lateral side, showing a state of an occupant restrained by an airbag.

As shown in FIG. 1 and FIG. 2, the side airbag device of Embodiment 1 is mounted on a lateral portion (lateral portion on an inner side in a vehicle width direction) of a seatback (backrest) 31 of a vehicle seat 30.

The vehicle seat 30 may be a driver's seat or a passenger seat of a vehicle, for example.

The side airbag device 1 includes an inflator 10 and an airbag 20.

The inflator 10 is provided inside the airbag 20. The inflator 10 is a cylindrical (columnar) gas-generating device, and is provided along the extending direction (height direction) of the seatback 31. A pair of bolts protrudes from upper and lower portions of the inflator 10, and this pair of bolts penetrates the airbag 20. The bolts fix the inflator 10 to the lateral portion (e.g., side frame) of the seatback 31.

The inflator 10 is activated in a lateral collision of the vehicle. Specifically, first, when an impact sensor mounted on the vehicle detects the lateral collision of the vehicle, the sensor transmits a signal to an electronic control unit (ECU) and the ECU calculates and determines the collision level. If the determined collision level corresponds to a level at which the side airbag 20 should be inflated, the inflator 10 is ignited to generate a gas by a chemical reaction due to combustion. The gas generated in the inflator 10 is then introduced into the airbag 20.

The inflator 10 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

The airbag 20 has a bag shape and is, before inflation and deployment, mounted in a folded state on the lateral portion of the seatback 31 (e.g., side frame) and stored together with a cushion pad while being covered with the outer layer of the seatback 31.

In the present embodiment, a world side impact dummy (World-SID) 40 is seated in the vehicle seat 30. The sitting position of the world side impact dummy 40 is in conformity with the side impact test (ECE R95) used in Japan and Europe or the side impact test (FMVSS214) used in the U.S. at present. The position and size of an airbag 20 in an inflated and deployed state are determined in accordance with the positions of parts such as a torso 41, a hip 42, a head 43, an arm 44, and a shoulder 45 of the world side impact dummy 40 shown in FIG. 1. The world side impact dummy 40 is hereinafter referred to as the "occupant 40".

The vehicle sidewall 50 may be any vehicle part placed on the outer side in the vehicle width direction relative to the occupant 40 seated in the vehicle seat 30 (the side opposing the console box 60), and collectively refers to parts such as side doors, pillars, and side windows.

The console box 60 is disposed on the inner side in the vehicle width direction relative to the vehicle seat 30. For example, the console box 60 is disposed in the central portion in the vehicle width direction between the driver's seat and the passenger seat. The console box 60 may function as an armrest that supports the arm 44 on the inner side in the vehicle width direction of the occupant 40.

When a vehicle has a lateral collision with an obstacle (e.g., another vehicle), specifically, when an obstacle collides with a vehicle sidewall opposing a vehicle sidewall 50 in the vehicle width direction (when the vehicle seat 30 is the driver's seat, the vehicle body portion on the outer side in the vehicle width direction relative to the passenger seat) and the inflator 10 is activated, the gas generated by the inflator 10 is introduced into the airbag 20 and the airbag 20 inflates while unfolded. The force applied from the inflated airbag 20 then tears open the outer layer of the seatback 31. Thereby, as shown in FIG. 1 and FIG. 2, the airbag 20 inflates and deploys in a space above the console box 60 and beside the occupant 40 seated in the vehicle seat 30 to protect the lateral portion of the occupant 40. The airbag 20 configured to inflate and deploy in this manner is also referred to as a far-side airbag.

The airbag 20 in the inflated and deployed state includes a first inflation portion 20a fixed to the vehicle seat 30 and a second inflation portion 20b inclining toward the occupant 40 with respect to the first inflation portion 20a. In other words, the airbag 20 has a structure in which, in case of a lateral collision of the vehicle, the airbag 20 inflates and deploys to form the first inflation portion 20a and the second inflation portion 20b. Presence of the first inflation portion 20a can stabilize the position of the airbag 20 inflated and deployed. Presence of the second inflation portion 20b can enhance the protection property of the occupant 40.

In the present embodiment, the airbag 20 designed to include the first inflation portion 20a and the second inflation portion 20b in the inflated and deployed state can be attained with a simple structure without a tether or a sub bag. The airbag 20 is a bag having a single cavity (chamber) without separation. A base fabric piece defining the first inflation portion 20a is not different from a base fabric piece defining the second inflation portion 20b. In other words, a part of a base fabric piece defines the first inflation portion 20a and another part thereof defines the second inflation portion 20b.

Figure 3:
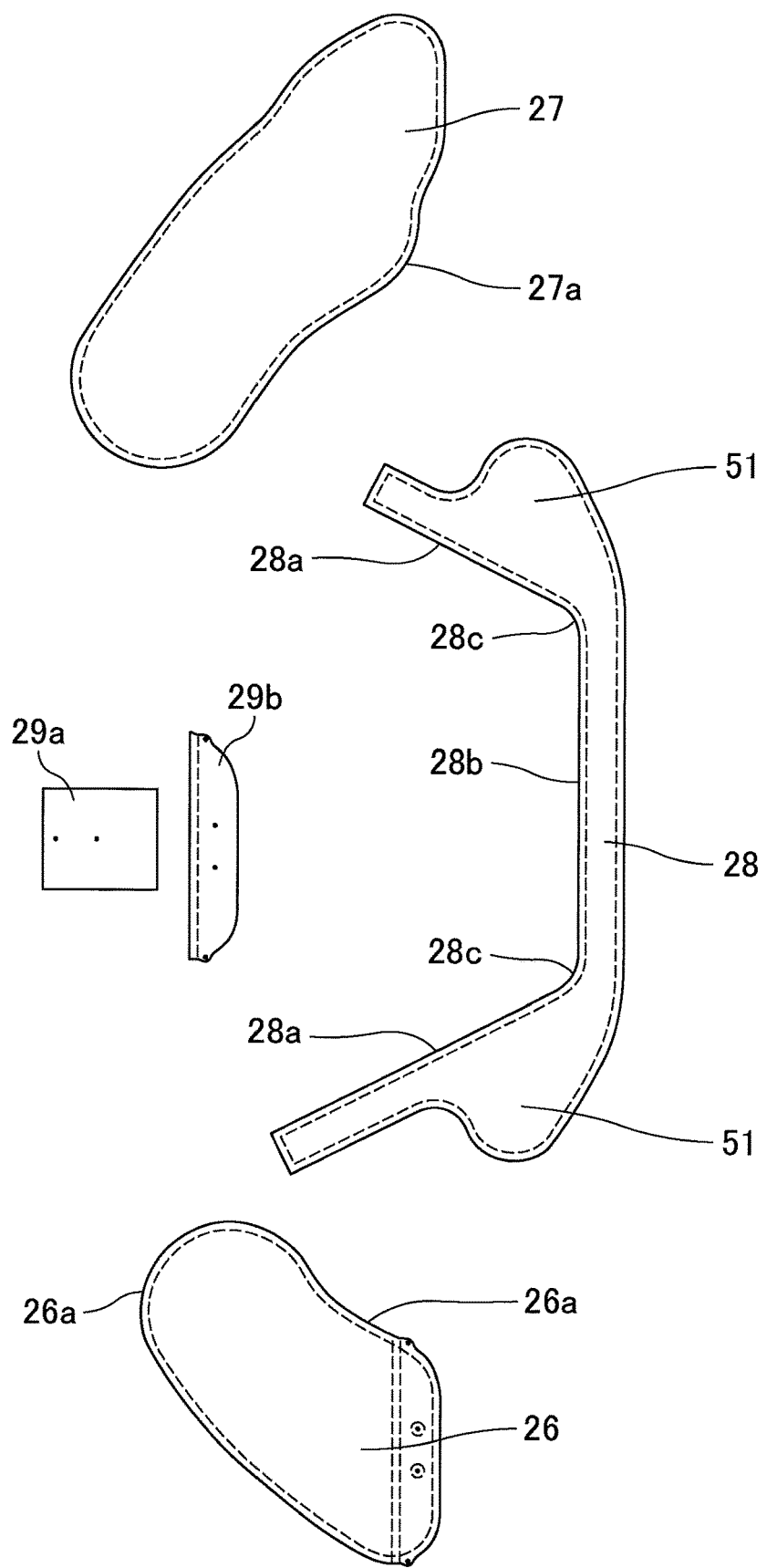
FIG. 3 is a schematic view showing the planar shapes of components defining the airbag of Embodiment 1.

FIG. 3 is a schematic view showing the planar shapes of components defining the airbag of Embodiment 1. As shown in FIG. 3, the airbag 20 is assembled from an occupant side panel 26 to be disposed on the occupant 40 side, a center side panel (non-occupant side panel) 27 to be disposed opposite the occupant side panel 26, and a strip connection panel 28 to connect a peripheral edge 26a of the occupant side panel 26 and a peripheral edge 27a of the center side panel 27. In other words, the peripheral edge of the strip connection panel 28 is connected to the occupant side panel 26 on one side and to the center side panel 27 on the other side. Use of such a connection panel 28 allows the center side panel 27 to be spaced from the occupant side panel 26 in the vehicle width direction. The center side panel 27 is to be disposed on the vehicle center side of the vehicle seat 30 in the vehicle width direction.

The airbag 20 may include as components a protection fabric piece 29a to be wound around the inflator 10 and a reinforcing fabric piece 29b to be disposed between the occupant side panel 26 and the inflator 10. Provision of the protection fabric piece 29a and the reinforcing fabric piece 29b can efficiently prevent breakage of the airbag 20 by high-temperature gas immediately after being generated from the inflator 10.

The occupant side panel 26, the center side panel 27, the connection panel 28, and the reinforcing fabric piece 29b are joined to one another along the joint lines indicated by the chain lines shown in FIG. 3. The joining may be performed by any technique, such as sewing, bonding, welding, or any combination thereof.

The occupant side panel 26, the center side panel 27, the connection panel 28, the protection fabric piece 29a, and the reinforcing fabric piece 29b are each made of, for example, a piece of cloth formed by weaving yarn such as yarn of nylon 66 or yarn of polyethylene terephthalate. In order to improve the heat resistance and the airtightness, the surfaces of the fabric pieces may be coated with an inorganic substance such as silicon.

The connection panel 28 includes bend portions 28c each located between a first peripheral edge portion 28a to be connected to the peripheral edge 26a of the occupant side panel 26 defining the first inflation portion 20a and a second peripheral edge portion 28b to be connected to the peripheral edge 26a of the occupant side panel 26 defining the second inflation portion 20b. Presence of the bend portions 28c in the connection panel 28 allows formation of the second inflation portion 20b inclining toward the occupant 40 with respect to the first inflation portion 20a.

Figure 4:
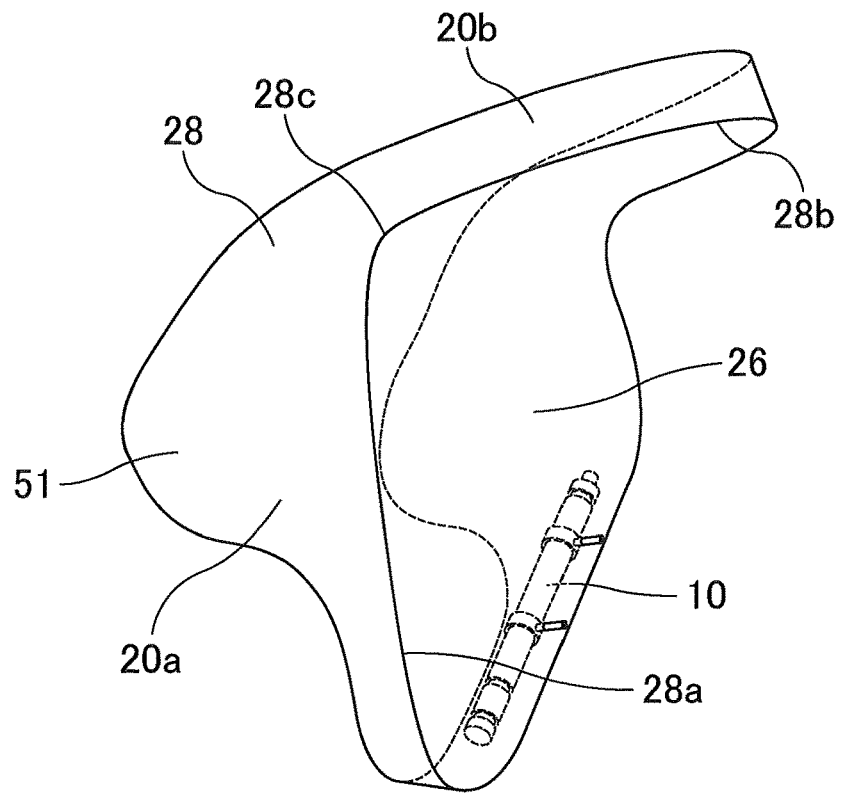
FIG. 4 is a schematic view of the airbag of Embodiment 1 viewed from the occupant side, showing a three-dimensional shape of the airbag in the inflated and deployed state.
Figure 5:
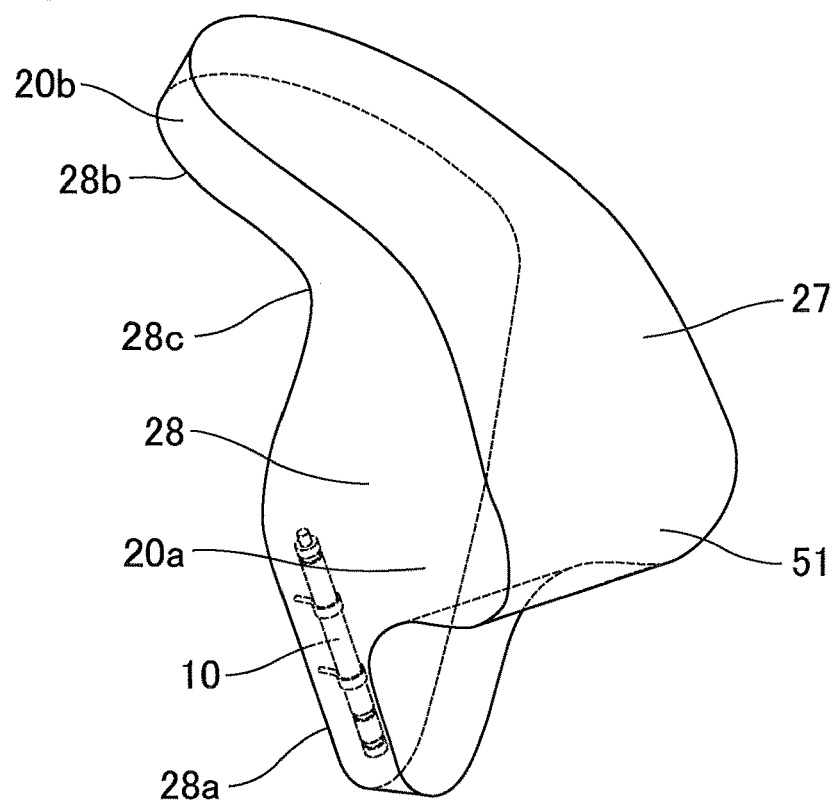
FIG. 5 is a schematic view of the airbag of Embodiment 1 viewed from the vehicle center side, showing a three-dimensional shape of the airbag in the inflated and deployed state.

FIG. 4 is a schematic view of the airbag of Embodiment 1 viewed from the occupant side, showing a three-dimensional shape of the airbag in the inflated and deployed state. FIG. 5 is a schematic view of the airbag of Embodiment 1 viewed from the vehicle center side, showing a three-dimensional shape of the airbag in the inflated and deployed state. The connection panel 28 connects the peripheral edge 26a of the occupant side panel 26 and the peripheral edge 27a of the center side panel 27 to bridge the space between the occupant side panel 26 and the center side panel 27, whereby the airbag 20 is formed into a three-dimensional box-like shape. Joining the occupant side panel 26, the center side panel 27, and the connection panel 28 having the shapes shown in FIG. 3 to one another can provide the airbag 20 that has a three-dimensional shape and includes the first inflation portion 20a and the second inflation portion 20b in the inflated and deployed state with a gas filled inside as shown in FIG. 4 and FIG. 5. Accordingly, the airbag 20 that bends toward the occupant 40 can be formed with a simple structure. The height of the second inflation portion 20b based on the upward/downward direction of the vehicle is preferably equal to or similar to the distance from the shoulder 45 to the head 43 of the occupant 40. In other words, the airbag 20 is preferred to be formed such that the upper end of the second inflation portion 20b receives the head 43 of the occupant 40 and the lower end of the second inflation portion 20b receives the shoulder 45 of the occupant 40.

Figure 6:
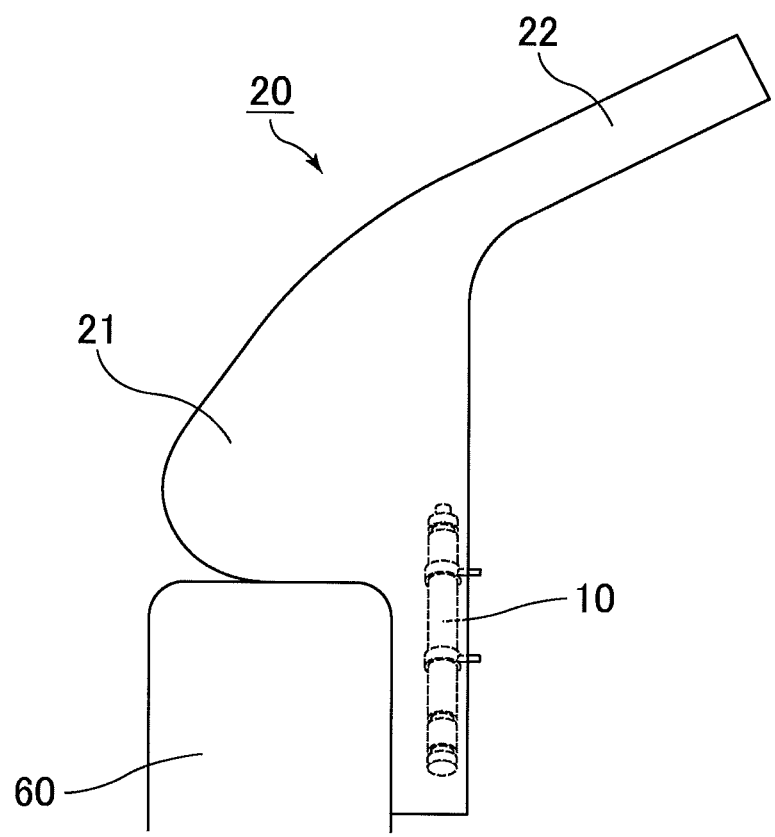
FIG. 6 is a schematic view of the airbag of Embodiment 1 viewed from the vehicle front/rear side, showing a cross section of the airbag in the inflated and deployed state.

FIG. 6 is a schematic view of the airbag of Embodiment 1 viewed from the vehicle front/rear side, showing a cross section of the airbag in the inflated and deployed state. As shown in FIG. 6, the occupant side panel 26 includes a torso protection portion 21 that receives a lateral portion of the torso 41 of the occupant 40 and a head protection portion 22 that receives the head 43 of the occupant 40. In other words, in case of a lateral collision of the vehicle, the torso protection portion 21 comes into contact with a lateral portion of the torso 41 of the occupant 40 and the head protection portion 22 provided on the upper side of the torso protection portion 21 comes into contact with the head 43 of the occupant 40. Here, the second peripheral edge portion 28b of the connection panel 28 included in the second inflation portion 20b is at least partly connected to the periphery of the head protection portion 22. This structure allows the head protection portion 22 of the occupant side panel 26 to come close to the head 43 of the occupant 40.

Preferably, the connection panel 28 is disposed on one or both of the vehicle front side and the vehicle rear side of the airbag 20, and the head protection portion 22 is inclined toward a lateral side of the head 43 of the occupant 40. The inclination toward the lateral side of the head 43 allows the head protection portion 22 to immediately come into contact with the head 43 of the occupant 40 turning in the vehicle width direction.

Preferably, the connection panel 28 is disposed on one or both of the vehicle front side and the vehicle rear side of the airbag 20 and at least a vehicle upper side in the vehicle upper/lower side of the airbag 20. In inflation of the airbag 20, the airbag 20 inflates into a round shape. When the occupant side panel 26 and the center side panel (non-occupant side panel) 27 are directly connected, the airbag 20 inflates in such a manner that the apparent length of the upper portion of the airbag 20 in the forward/backward direction of the vehicle decreases. However, provision of the connection panel 28, which is connected to the occupant side panel 26 and the center side panel 27 on one or both of the vehicle front side and the vehicle rear side of the airbag and bridges between the occupant side panel 26 and the center side panel 27, causes the upper portion of the airbag 20 to be pulled in the forward/backward direction of the vehicle in which a pressure receiving area becomes greater in the connection panel 28, whereby the apparent length is less likely to be reduced. As a result, the range for protecting the head 43 of the occupant 40 can be increased.

In case of a lateral collision of the vehicle, the occupant 40 seated in the vehicle seat 30 moves to the inner side in the vehicle width direction. The airbag 20 inflates and deploys to allow the torso protection portion 21 to receive the torso 41, i.e., a portion lower than the shoulder 45, of the moving occupant 40 to restrain the moving occupant 40. At this time, as a reaction to the restraint of the torso 41 of the occupant 40 by the torso protection portion 21, the head 43 of the occupant 40 turns to the airbag 20 side. Here, the head protection portion 22, inclining from the upper side of the torso protection portion 21 toward the lateral side of the head 43 of the occupant 40, can immediately come into contact with the lateral portion of the turning head 43 of the occupant 40 to restrain the head 43. Also, even when the torso protection portion 21 having restrained the torso 41 of the occupant 40 moves to the inner side in the vehicle width direction and thereby the head protection portion 22 is going to be apart from the occupant 40, the head protection portion 22 can remain in the vicinity of the head 43 of the occupant 40. Accordingly, the side airbag device of Embodiment 1 can restrict the movement of the occupant 40 to the inner side in the vehicle width direction while restraining the head 43 of the occupant 40.

The torso protection portion 21 in the inflated and deployed state preferably lifts the arm 44 of the occupant 40. Lifting the arm 44 of the occupant 40 by the torso protection portion 21 brings the arm 44 between the torso protection portion 21 and the head protection portion 22. Thereby, the head protection portion 22 having restrained the head 43 of the occupant 40, even when going to turn in the downward direction, is supported by the arm 44 of the occupant 40 lifted by the torso protection portion 21 and thus tends to restrain the head 43.

The side airbag device of Embodiment 1 can have a simple structure and can allow the airbag 20 to deploy in a desired position. Thus, in case of a lateral collision of the vehicle, the airbag 20 can immediately receive the head 43 of the occupant 40 turning in the vehicle width direction.

In Embodiment 1, the connection panel 28 is provided with protruding portions 51 as shown in FIG. 3, and the airbag 20 has a change in thickness in the protruding portion 51 of the connection panel 28 as shown in FIGS. 4 and 5.

The connection panel 28 bridges the space between the occupant side panel 26 and the center side panel 27, whereby the airbag 20 is formed into a three-dimensional box-like shape. Provision of the protruding portions 51 in part of the connection panel 28 changes the inflation shapes of the airbag 20 at portions close to the occupant side panel 26 and the center side panel 27 connected to the protruding portions 51, whereby the airbag 20 has a greater thickness in the protruding portion 51.

Alternatively, the connection panel 28 may be partly provided with recessed portions instead of the protruding portions 51. Provision of recessed portions in part of the connection panel 28 changes the inflation shapes of the airbag 20 at portions close to the occupant side panel 26 and the center side panel 27 connected to the recessed portions, whereby the airbag 20 has a smaller thickness in the recessed portion.

Providing the protruding portion 51 or recessed portion can easily control the thickness of the airbag 20 even when the airbag 20 inflates and deploys in a position close to a vehicle member such as the console box 60, whereby the airbag 20 can be inflated and deployed in a desired position.

Embodiment 2

Hereinafter, a side airbag device of Embodiment 2 of the present invention is described with reference to the drawings. The side airbag device of Embodiment 2 is similar to the side airbag device of Embodiment 1 except for the structure of the airbag. The same features therefore will not be elaborated upon here.

Figure 7:
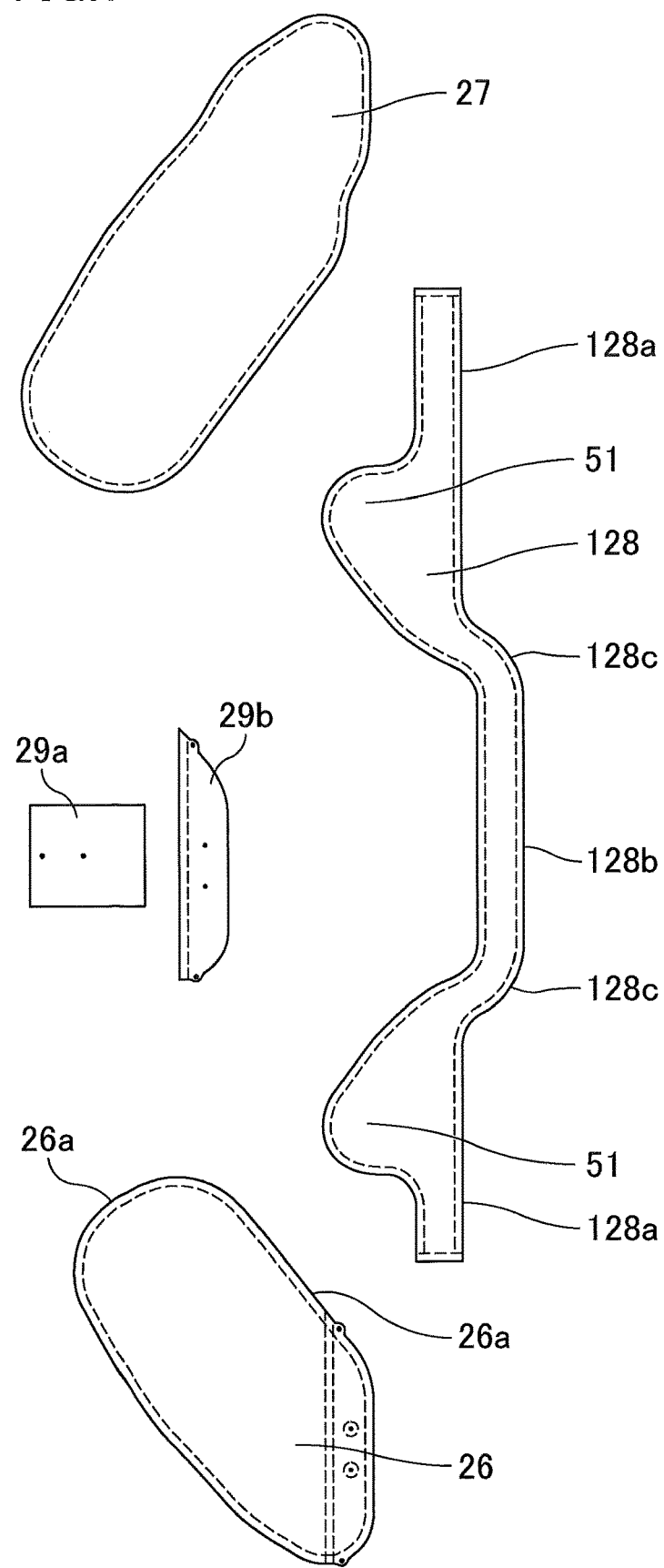
FIG. 7 is a schematic view showing the planar shapes of components defining an airbag of Embodiment 2.

FIG. 7 is a schematic view showing the planar shapes of components defining the airbag of Embodiment 2. As shown in FIG. 7, components defining the airbag of Embodiment 2 include the occupant side panel 26, the center side panel (non-occupant side panel) 27, a connection panel 128, the protection fabric piece 29a, and the reinforcing fabric piece 29b. The occupant side panel 26, the center side panel 27, the connection panel 128, and the reinforcing fabric piece 29b are joined to one another along the joint lines indicated by the chain lines shown in FIG. 7. The airbag of Embodiment 2 is different from the airbag of Embodiment 1 in the point that the strip connection panel 128 connecting the peripheral edge 26a of the occupant side panel 26 and the peripheral edge 27a of the center side panel 27 has a different shape from the connection panel 28.

The connection panel 128 includes bend portions 128c each located between a first peripheral edge portion 128a to be connected to the peripheral edge 26a of the occupant side panel 26 defining the first inflation portion 20a and a second peripheral edge portion 128b to be connected to the peripheral edge 26a of the occupant side panel 26 defining the second inflation portion 20b. Presence of the bend portions 128c in the connection panel 128 allows formation of the second inflation portion 20b inclining toward the occupant 40 with respect to the first inflation portion 20a.

Figure 8:
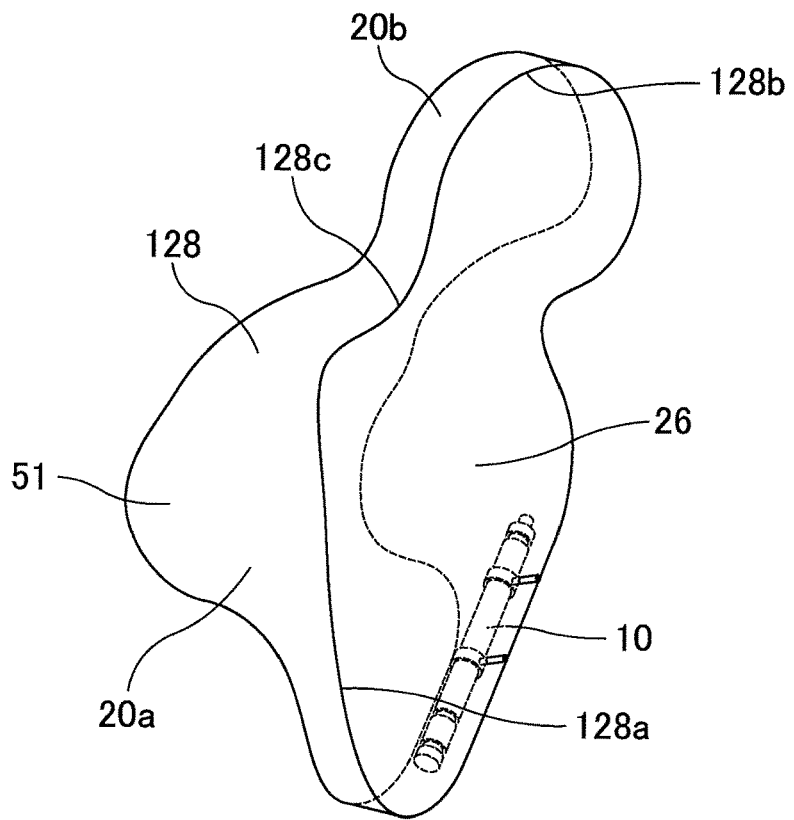
FIG. 8 is a schematic view of the airbag of Embodiment 2 viewed from the vehicle front side and occupant side, showing a three-dimensional shape of the airbag in the inflated and deployed state.
Figure 9:
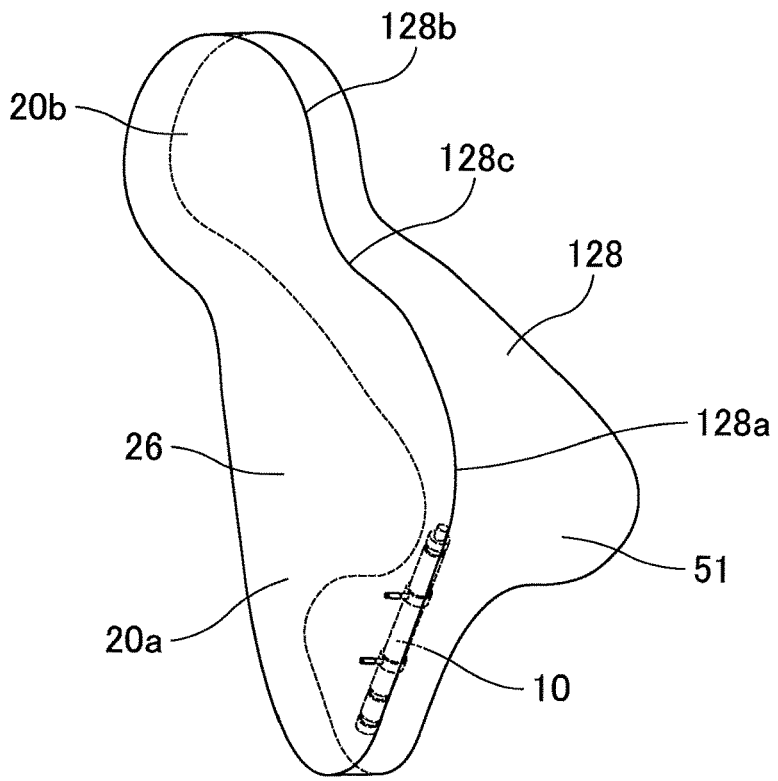
FIG. 9 is a schematic view of the airbag of Embodiment 2 viewed from the vehicle rear side and occupant side, showing a three-dimensional shape of the airbag in the inflated and deployed state.

FIG. 8 is a schematic view of the airbag of Embodiment 2 viewed from the vehicle front side and occupant side, showing a three-dimensional shape of the airbag in the inflated and deployed state. FIG. 9 is a schematic view of the airbag of Embodiment 2 viewed from the vehicle rear side and occupant side, showing a three-dimensional shape of the airbag in the inflated and deployed state. The connection panel 128 connects the peripheral edge 26a of the occupant side panel 26 and the peripheral edge of the center side panel 27 to bridge the space between the occupant side panel 26 and the center side panel 27, whereby the airbag 20 is formed into a three-dimensional box-like shape. Joining the occupant side panel 26, the center side panel 27, and the connection panel 128 having the shapes shown in FIG. 7 to one another can provide the airbag 20 that has a three-dimensional shape and includes the first inflation portion 20a and the second inflation portion 20b in the inflated and deployed state with a gas filled inside as shown in FIG. 8 and FIG. 9. Accordingly, the airbag 20 that bends toward the occupant 40 can be formed with a simple structure.

Figure 10:
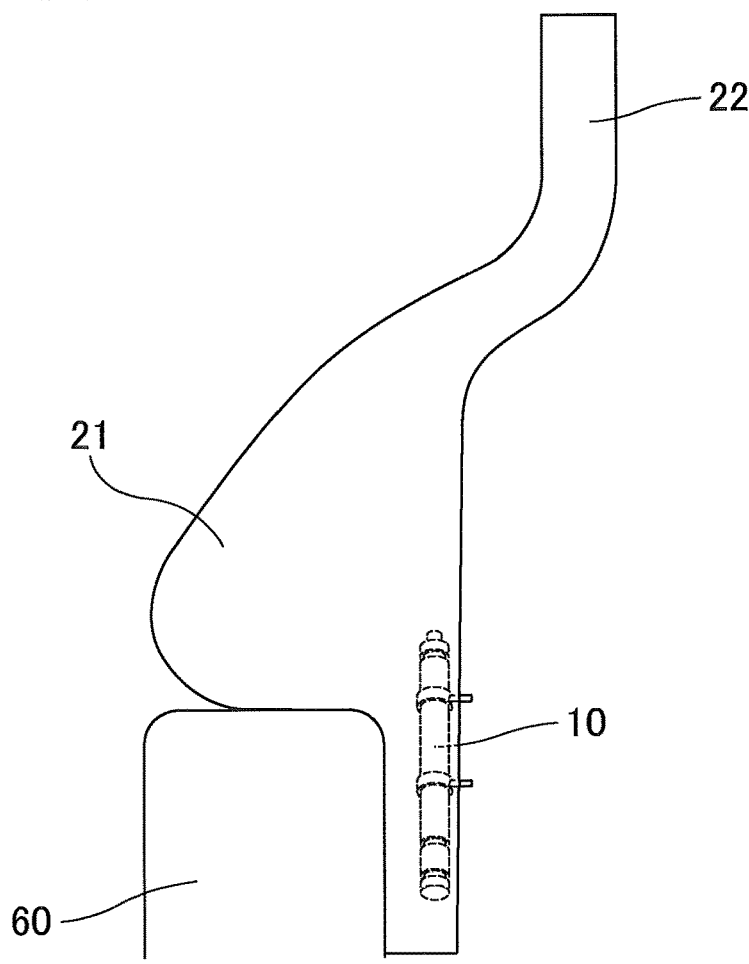
FIG. 10 is a schematic view of the airbag of Embodiment 2 viewed from the vehicle front/rear side, showing a cross section of the airbag in the inflated and deployed state.

FIG. 10 is a schematic view of the airbag of Embodiment 2 viewed from the vehicle front/rear side, showing a cross section of the airbag in the inflated and deployed state. As shown in FIG. 10, the occupant side panel 26 includes the torso protection portion 21 that receives a lateral portion of the torso 41 of the occupant 40 and the head protection portion 22 that receives the head 43 of the occupant 40.

The side airbag device of Embodiment 2 can have a simple structure and can allow the airbag 20 to deploy in a desired position. Thus, in case of a lateral collision of the vehicle, the airbag 20 can immediately receive the head 43 of the occupant 40 turning in the vehicle width direction.

In Embodiment 2, the connection panel 128 is provided with the protruding portions 51 as shown in FIG. 7, and the airbag 20 has a change in thickness in the protruding portion 51 of the connection panel 128 as shown in FIGS. 8 and 9. Provision of the protruding portions 51 in part of the connection panel 128 changes the inflation shapes of the airbag 20 at portions close to the occupant side panel 26 and the center side panel 27 connected to the protruding portions 51, whereby the airbag 20 has a greater thickness in the protruding portion 51.

Embodiment 3

Hereinafter, a side airbag device of Embodiment 3 of the present invention is described with reference to the drawings. The airbag of the side airbag device of Embodiment 3 includes an end on the vehicle front side inclining toward the head of the occupant. The side airbag device of Embodiment 3 is similar to the side airbag device of Embodiment 1 except for the structure of the airbag. The same features therefore will not be elaborated upon here.

Figure 11:
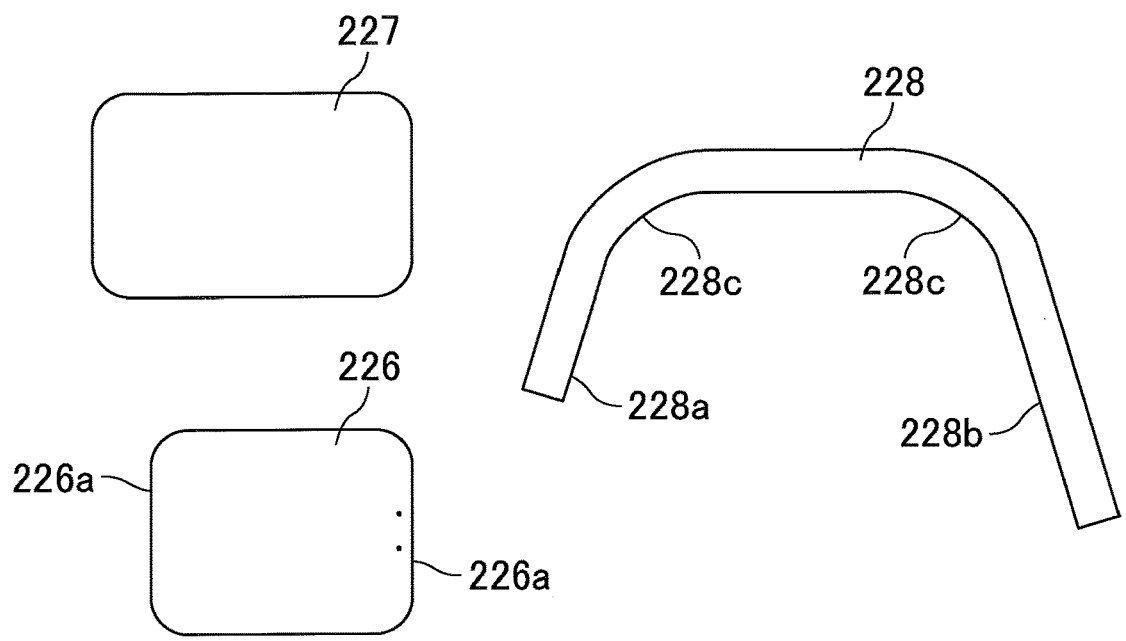
FIG. 11 is a schematic view showing the planar shapes of components defining an airbag of Embodiment 3.

FIG. 11 is a schematic view showing the planar shapes of components defining the airbag of Embodiment 3. As shown in FIG. 11, components defining the airbag of Embodiment 3 include an occupant side panel 226, a center side panel (non-occupant side panel) 227, and a connection panel 228, and optionally a protection fabric piece and a reinforcing fabric piece.

The connection panel 228 includes bend portions 228c each located between a first peripheral edge portion 228a to be connected to a peripheral edge 226a of the occupant side panel 226 defining the first inflation portion 20a and a second peripheral edge portion 228b to be connected to the peripheral edge 226a of the occupant side panel 226 defining the second inflation portion 20b. Presence of the bend portions 228c in the connection panel 228 allows formation of the second inflation portion 20b inclining toward the occupant 40 with respect to the first inflation portion 20a.

Figure 12:
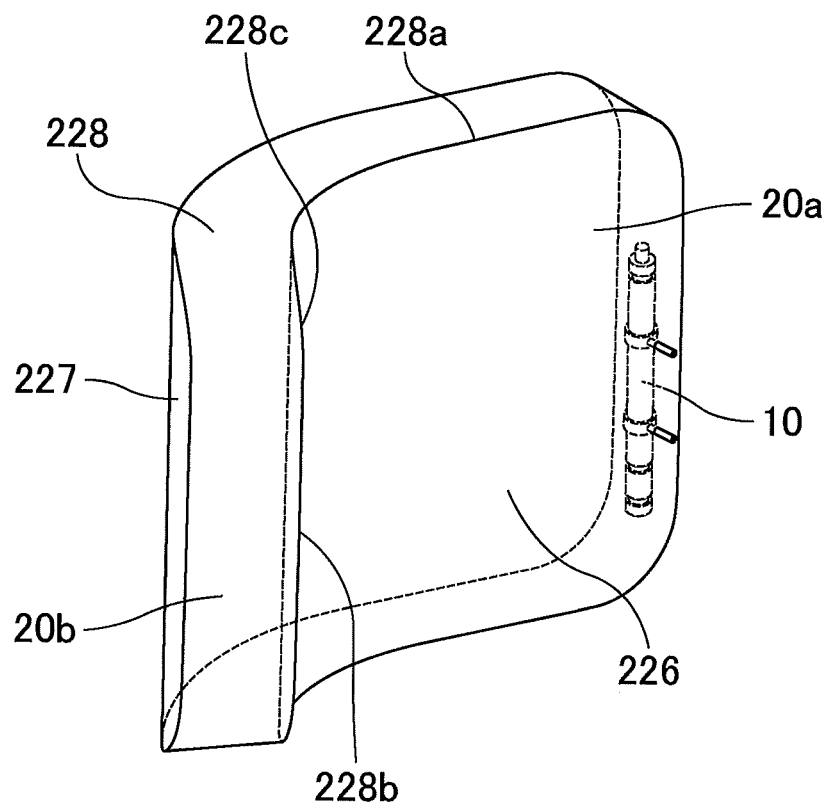
FIG. 12 is a schematic view of the airbag of Embodiment 3 viewed from the occupant side, showing a three-dimensional shape of the airbag in the inflated and deployed state.
Figure 13:
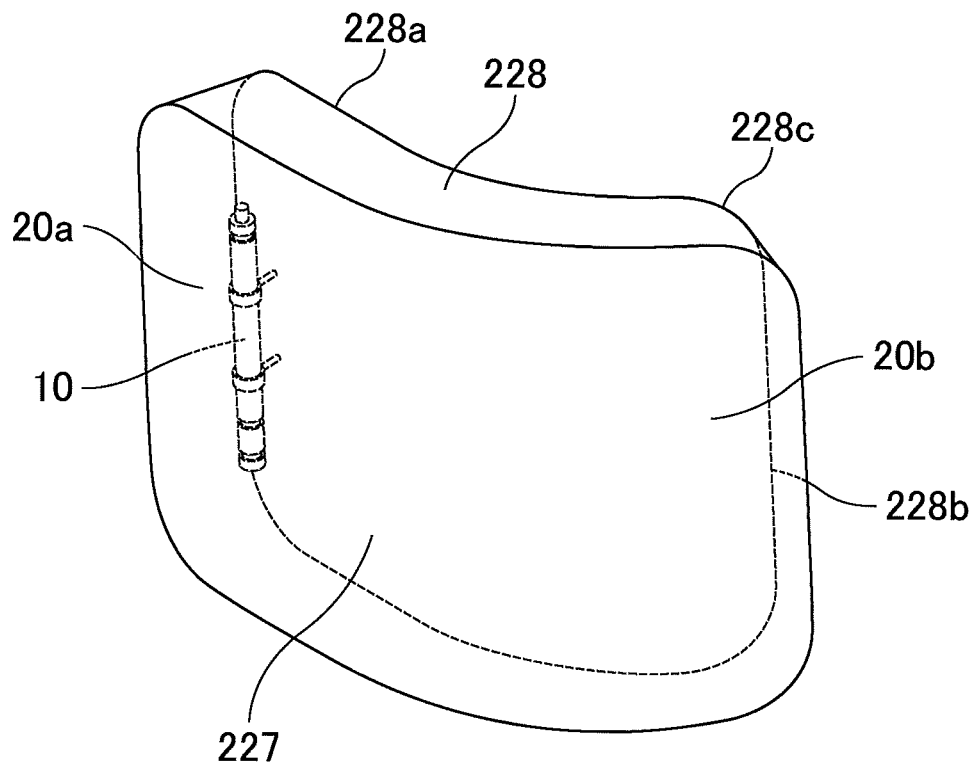
FIG. 13 is a schematic view of the airbag of Embodiment 3 viewed from the vehicle center side, showing a three-dimensional shape of the airbag in the inflated and deployed state.

FIG. 12 is a schematic view of the airbag of Embodiment 3 viewed from the occupant side, showing a three-dimensional shape of the airbag in the inflated and deployed state. FIG. 13 is a schematic view of the airbag of Embodiment 3 viewed from the vehicle center side, showing a three-dimensional shape of the airbag in the inflated and deployed state. The connection panel 228 connects the peripheral edge 226a of the occupant side panel 226 and the peripheral edge of the center side panel 227 to bridge the space between the occupant side panel 226 and the center side panel 227, whereby the airbag 20 is formed into a three-dimensional box-like shape. Joining the occupant side panel 226, the center side panel 227, and the connection panel 228 having the shapes shown in FIG. 11 to one another can provide the airbag 20 that has a three-dimensional shape and includes the first inflation portion 20a and the second inflation portion 20b in the inflated and deployed state with a gas filled inside as shown in FIG. 12 and FIG. 13. Accordingly, the airbag 20 that bends toward the occupant 40 can be formed with a simple structure.

Figure 14:
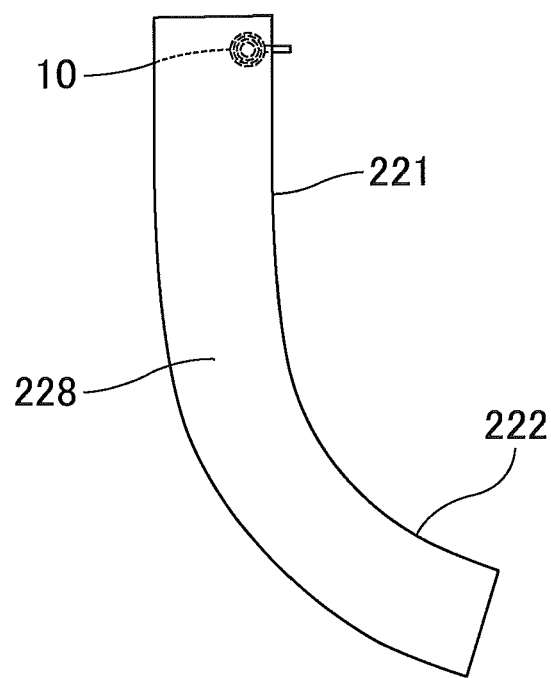
FIG. 14 is a schematic view of the airbag of Embodiment 3 viewed from the vehicle upper/lower side, showing a cross section of the airbag in the inflated and deployed state.

FIG. 14 is a schematic view of the airbag of Embodiment 3 viewed from the vehicle upper/lower side, showing a cross section of the airbag in the inflated and deployed state. As shown in FIG. 14, the occupant side panel 226 includes a torso protection portion 221 that receives a lateral portion of the torso 41 of the occupant 40 and a head protection portion 222 that receives the head 43 of the occupant 40.

The side airbag device of Embodiment 3 can have a simple structure and can allow the airbag 20 to deploy in a desired position.

Also, in Embodiment 3, the connection panel 228 is disposed on one or both of the vehicle upper side and the vehicle lower side of the airbag 20, and the head protection portion 222 is disposed from the lateral side of the head 43 of the occupant 40 to a position closer to the vehicle front side with respect to the head 43 of the occupant 40 and is inclined toward the front side of the head 43 of the occupant 40. The head protection portion 222 inclining toward the front side of the head 43 can immediately receive the head 43 of the occupant 40 even when the occupant 40 moves diagonally forward in case of a lateral collision of the vehicle.

The airbag of Embodiment 3 may be assembled from any components other than the occupant side panel 226, the center side panel 227, and the connection panel 228 whose shapes are shown in FIG. 11, and may be formed by combination of an occupant side panel, a center side panel, and a connection panel having different shapes from those described.

Figure 15:
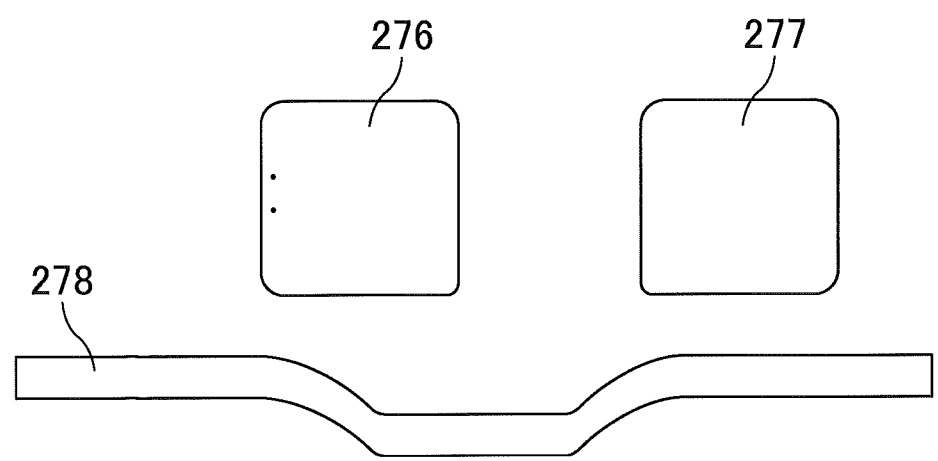
FIG. 15 is a schematic view showing a different example of the planar shapes of components defining the airbag of Embodiment 3.

FIG. 15 is a schematic view showing a different example of the planar shapes of components defining the airbag of Embodiment 3. Combination of an occupant side panel 276, a center side panel 277, and a connection panel 278 whose shapes are shown in FIG. 15 can form an airbag having the same shape as that formed by combination of the occupant side panel 226, the center side panel 227, and the connection panel 228 whose shapes are shown in FIG. 11.

Embodiment 4

Hereinafter, a side airbag device of Embodiment 4 of the present invention is described with reference to the drawings. The airbag of the side airbag device of Embodiment 4 includes an end on the vehicle upper side and the vehicle front side inclining toward the head of the occupant. The side airbag device of Embodiment 4 is similar to the side airbag device of Embodiment 1 except for the structure of the airbag. The same features therefore will not be elaborated upon here.

Figure 16:
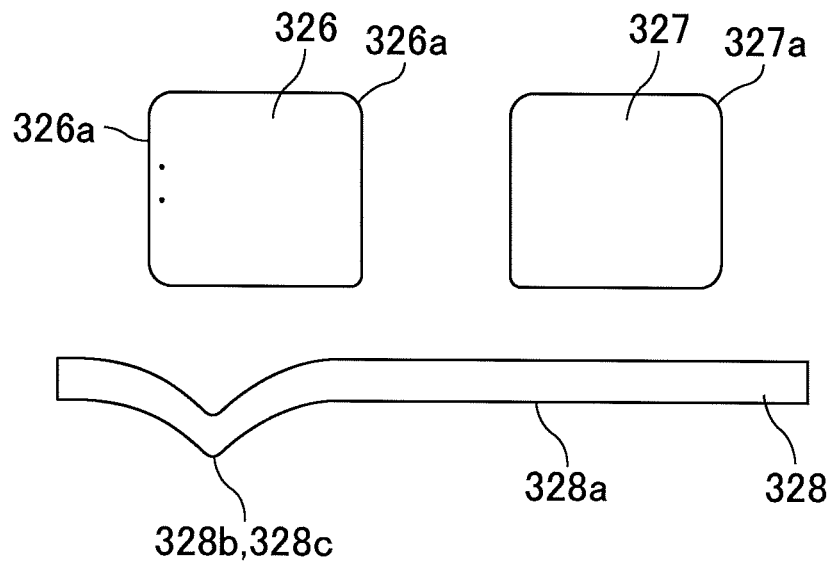
FIG. 16 is a schematic view showing the planar shapes of components defining an airbag of Embodiment 4.

FIG. 16 is a schematic view showing the planar shapes of components defining the airbag of Embodiment 4. As shown in FIG. 16, components defining the airbag of Embodiment 4 include an occupant side panel 326, a center side panel (non-occupant side panel) 327, and a connection panel 328, and optionally a protection fabric piece and a reinforcing fabric piece.

The connection panel 328 includes a first peripheral edge portion 328a to be connected to a peripheral edge 326a of the occupant side panel 326 defining the first inflation portion 20a and a second peripheral edge portion 328b to be connected to the peripheral edge 326a of the occupant side panel 326 defining the second inflation portion 20b, and has a bend in the second peripheral edge portion 328b. In other words, in the present embodiment, a bend portion 328c of the connection panel 328 also functions as the second peripheral edge portion 328b. Presence of the bend portion 328c in the connection panel 328 allows formation of the second inflation portion 20b inclining toward the occupant 40 with respect to the first inflation portion 20a.

Figure 17:
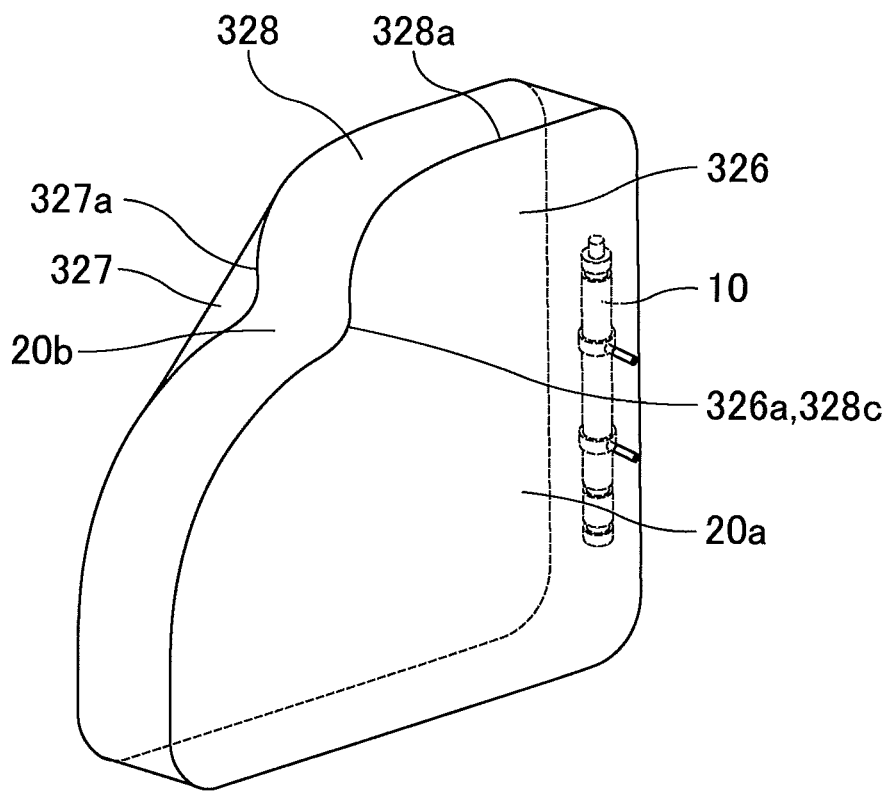
FIG. 17 is a schematic view of the airbag of Embodiment 4 viewed from the vehicle front side and occupant side, showing a three-dimensional shape of the airbag in the inflated and deployed state.
Figure 18:
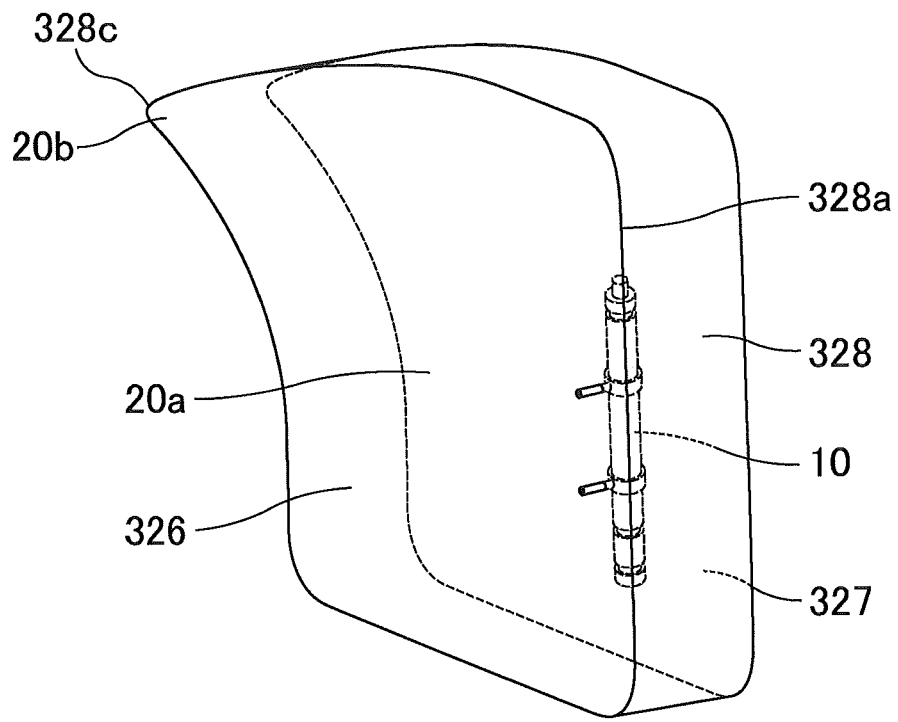
FIG. 18 is a schematic view of the airbag of Embodiment 4 viewed from the vehicle rear side and occupant side, showing a three-dimensional shape of the airbag in the inflated and deployed state.

FIG. 17 is a schematic view of the airbag of Embodiment 4 viewed from the vehicle front side and occupant side, showing a three-dimensional shape of the airbag in the inflated and deployed state. FIG. 18 is a schematic view of the airbag of Embodiment 4 viewed from the vehicle rear side and occupant side, showing a three-dimensional shape of the airbag in the inflated and deployed state. The connection panel 328 connects the peripheral edge 326a of the occupant side panel 326 and a peripheral edge 327a of the center side panel 327 to bridge the space between the occupant side panel 326 and the center side panel 327, whereby the airbag 20 is formed into a three-dimensional box-like shape. Joining the occupant side panel 326, the center side panel 327, and the connection panel 328 having the shapes shown in FIG. 16 to one another can provide the airbag 20 that has a three-dimensional shape and includes the first inflation portion 20a and the second inflation portion 20b in the inflated and deployed state with a gas filled inside as shown in FIG. 17 and FIG. 18. Accordingly, the airbag 20 that bends toward the occupant 40 can be formed with a simple structure.

The side airbag device of Embodiment 4 can have a simple structure and can allow the airbag 20 to deploy in a desired position.

Figure 19:
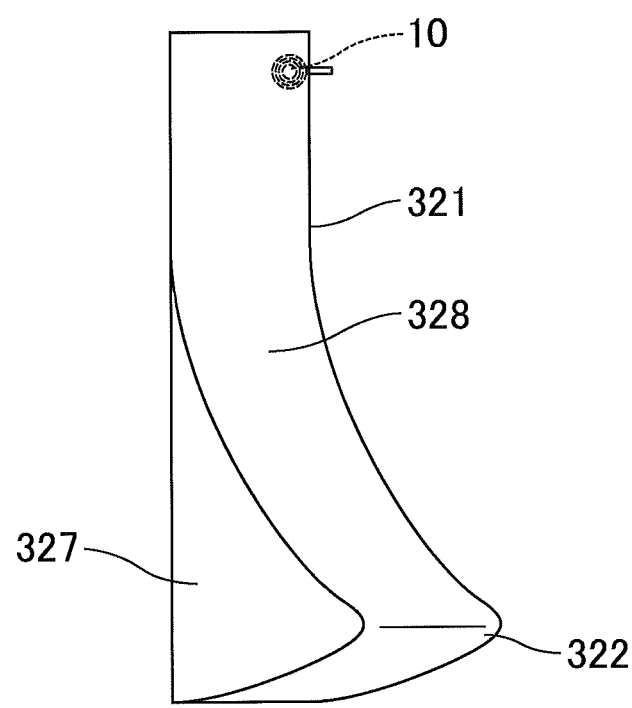
FIG. 19 is a schematic view of the airbag of Embodiment 4 viewed from the vehicle upper side, showing a cross section of the airbag in the inflated and deployed state.

FIG. 19 is a schematic view of the airbag of Embodiment 4 viewed from the vehicle upper side, showing a cross section of the airbag in the inflated and deployed state. As shown in FIG. 19, the occupant side panel 326 includes a torso protection portion 321 that receives a lateral portion of the torso 41 of the occupant 40 and a head protection portion 322 that receives the head 43 of the occupant 40. The head protection portion 322 is disposed from the lateral side of the head 43 of the occupant 40 to a position closer to the vehicle front side with respect to the head 43 of the occupant 40 and is inclined toward the front side of the head 43 of the occupant 40. The head protection portion 322 inclining toward the front side of the head 43 can immediately receive the head 43 of the occupant 40 even when the occupant 40 moves diagonally forward in case of a lateral collision of the vehicle.

Embodiment 5

The side airbag devices of Embodiments 1 to 4 are assumed to restrain the occupant 40 seated in the vehicle seat 30 provided with the inflator 10 and the airbag 20, but are not assumed to restrain an occupant 140 seated in a vehicle seat 130 next to the vehicle seat 30 with the console box 60 in between. Meanwhile, a side airbag device of Embodiment 5 is provided with an airbag 120 that can restrain not only the occupant 40 seated in the vehicle seat 30 provided with the inflator 10 and the airbag 20 but also the occupant 140 seated in the vehicle seat 130 next to the vehicle seat 30. Hereinafter, the side airbag device of Embodiment 5 of the present invention is described. The same features as in the side airbag device of Embodiment 1 will not be elaborated.

Figure 20:
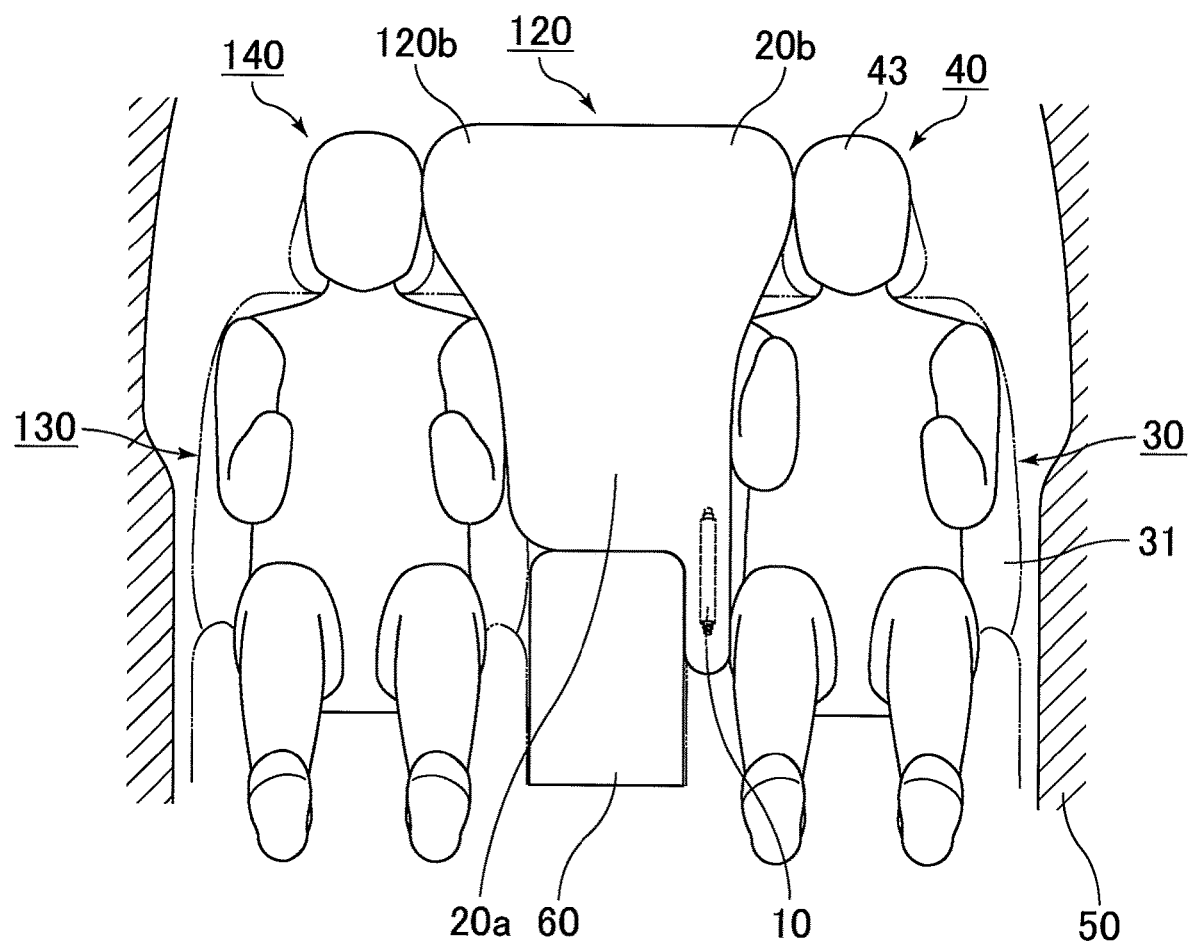
FIG. 20 is a schematic view of a side airbag device of Embodiment 5 viewed from the vehicle front side, showing a state of occupants restrained by an airbag.

FIG. 20 is a schematic view of a side airbag device of Embodiment 5 viewed from the vehicle front side, showing a state of occupants restrained by an airbag. When the vehicle has a lateral collision with an obstacle and the inflator 10 is activated, a gas generated by the inflator 10 is introduced into the airbag 120 and the airbag 120 inflates while unfolded. The force applied from the inflated airbag 120 then tears open the outer layer of the seatback 31. Thereby, as shown in FIG. 20, the airbag 120 inflates and deploys in a space above the console box 60 and besides the occupants 40 and 140 seated in the vehicle seats 30 and 130, respectively, to protect lateral portions of the occupants 40 and 140.

The airbag 120 in the inflated and deployed state includes the first inflation portion 20a fixed to the vehicle seat 30, the second inflation portion 20b inclining toward the occupant 40 with respect to the first inflation portion 20a, and a third inflation portion 120b inclining toward the occupant 140 with respect to the first inflation portion 20a. In other words, the airbag 120 has a structure in which, in case of a lateral collision of the vehicle, the airbag 120 inflates and deploys to form the first inflation portion 20a, the second inflation portion 20b, and the third inflation portion 120b. Presence of the first inflation portion 20a can stabilize the position of the airbag 120 inflated and deployed. Presence of the second inflation portion 20b can enhance the protection property of the occupant 40. Furthermore, presence of the third inflation portion 120b can enhance the protection property of the occupant 140.

In the present embodiment, the airbag 120 designed to include the first inflation portion 20a, the second inflation portion 20b, and the third inflation portion 120b in the inflated and deployed state can be attained with a simple structure without a tether or a sub bag. The airbag 120 is a bag having a single cavity (chamber) without separation. A base fabric piece defining the first inflation portion 20a is not different from a base fabric piece defining the second inflation portion 20b or a base fabric piece defining the third inflation portion 120b. In other words, a part of a base fabric piece defines the first inflation portion 20a, another part thereof defines the second inflation portion 20b, and still another part thereof defines the third inflation portion 120b.

Figure 21:
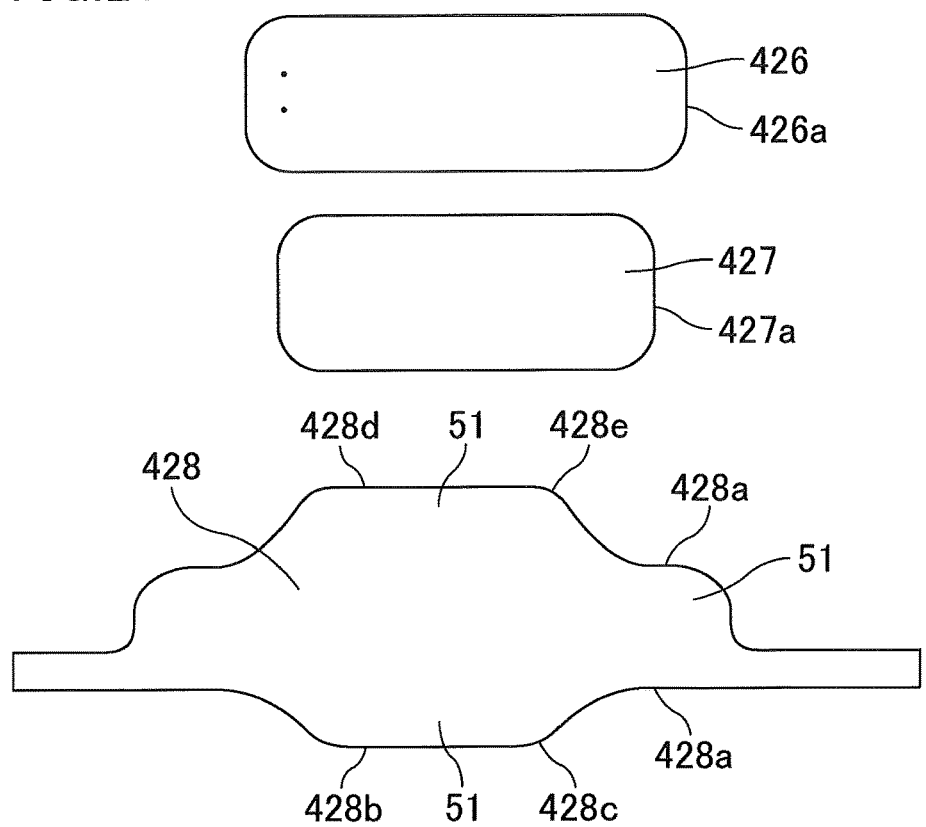
FIG. 21 is a schematic view showing the planar shapes of components defining the airbag of Embodiment 5.

FIG. 21 is a schematic view showing the planar shapes of components defining the airbag of Embodiment 5. As shown in FIG. 21, the airbag 120 is assembled from an occupant side panel 426 to be disposed on the occupant 40 side, a center side panel (non-occupant side panel) 427 to be disposed on the occupant 140 side and opposite the occupant side panel 426, and a strip connection panel 428 to connect a peripheral edge 426a of the occupant side panel 426 and a peripheral edge 427a of the center side panel 427. In other words, the peripheral edge of the strip connection panel 428 is connected to the occupant side panel 426 on one side and to the center side panel 427 on the other side. Use of such a connection panel 428 allows the center side panel 427 to be spaced from the occupant side panel 426 in the vehicle width direction.

The connection panel 428 includes a bend portion 428c located between a first peripheral edge portion 428a to be connected to the peripheral edge 426a of the occupant side panel 426 defining the first inflation portion 20a and a second peripheral edge portion 428b to be connected to the peripheral edge 426a of the occupant side panel 426 defining the second inflation portion 20b. Presence of the bend portion 428c in the connection panel 428 allows formation of the second inflation portion 20b inclining toward the occupant 40 with respect to the first inflation portion 20a. The connection panel 428 also includes a bend portion 428e located between a first peripheral edge portion 428a to be connected to the peripheral edge 426a of the occupant side panel 426 defining the first inflation portion 20a and a third peripheral edge portion 428d to be connected to the peripheral edge 427a of the center side panel 427 defining the third inflation portion 120b. Presence of the bend portion 428e in the connection panel 428 allows formation of the third inflation portion 120b inclining toward the occupant 140 with respect to the first inflation portion 20a. In other words, in the airbag 120 of Embodiment 5, not only that the route of the peripheral edge of the connection panel 428 on the side to be connected to the peripheral edge 426a of the occupant side panel 426 shifts to the occupant 40 side, but also that the route of the peripheral edge of the connection panel 428 on the side to be connected to the peripheral edge 427a of the center side panel 427 shifts to the occupant 140 side.

Figure 22:
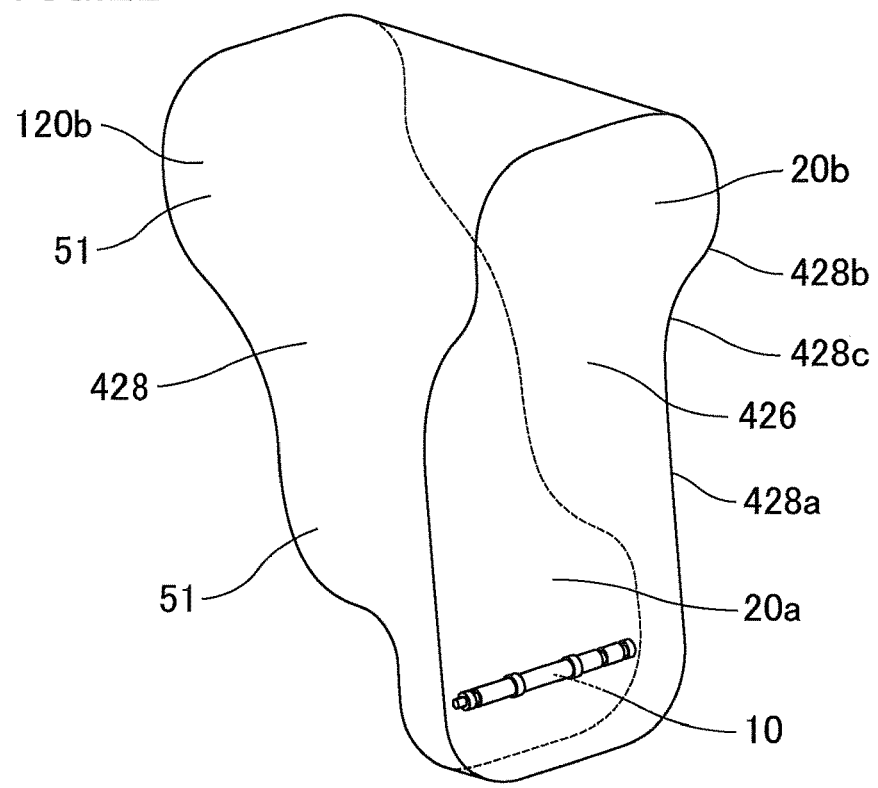
FIG. 22 is a schematic view of the airbag of Embodiment 5 viewed from the occupant side, showing a three-dimensional shape of the airbag in the inflated and deployed state.
Figure 23:
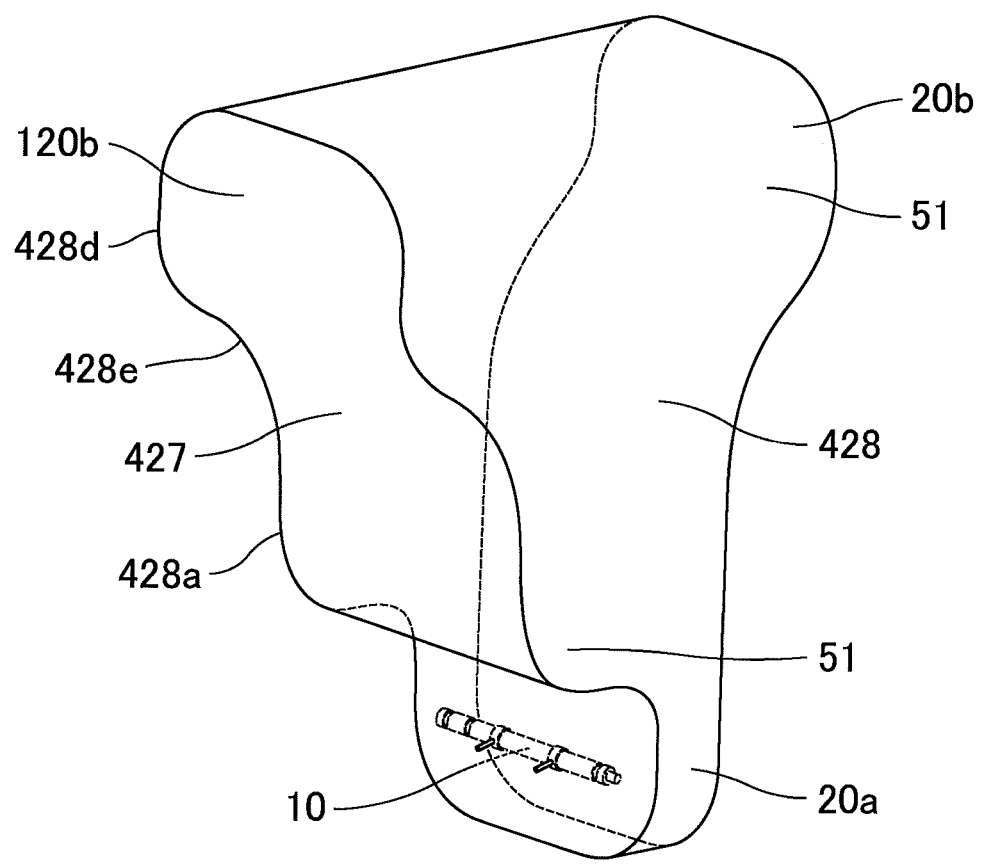
FIG. 23 is a schematic view of the airbag of Embodiment 5 viewed from the vehicle center side, showing a three-dimensional shape of the airbag in the inflated and deployed state.

FIG. 22 is a schematic view of the airbag of Embodiment 5 viewed from the occupant side, showing a three-dimensional shape of the airbag in the inflated and deployed state. FIG. 23 is a schematic view of the airbag of Embodiment 5 viewed from the vehicle center side, showing a three-dimensional shape of the airbag in the inflated and deployed state. The connection panel 428 connects the peripheral edge 426a of the occupant side panel 426 and the peripheral edge 427a of the center side panel 427 to bridge the space between the occupant side panel 426 and the center side panel 427, whereby the airbag 120 is formed into a three-dimensional box-like shape. Joining the occupant side panel 426, the center side panel 427, and the connection panel 428 having the shapes shown in FIG. 21 to one another can provide the airbag 120 that has a three-dimensional shape and includes the first inflation portion 20a, the second inflation portion 20b, and the third inflation portion 120b in the inflated and deployed state with a gas filled inside as shown in FIG. 22 and FIG. 23. Accordingly, the airbag 120 that bends toward the occupant 40 and the occupant 140 can be formed with a simple structure.

The side airbag device of Embodiment 5 can have a simple structure and can allow the airbag 120 to deploy in a desired position. Thus, in case of a lateral collision of the vehicle, the airbag 120 can immediately receive the heads of the occupant 40 and the occupant 140 turning in the vehicle width direction.

In Embodiment 5, the connection panel 428 is provided with the protruding portions 51 as shown in FIG. 21, and the airbag 120 has a change in thickness in the protruding portions 51 of the connection panel 428 as shown in FIGS. 22 and 23. Provision of the protruding portions 51 in part of the connection panel 428 changes the inflation shapes of the airbag 120 at portions close to the occupant side panel 426 and the center side panel 427 connected to the protruding portions 51, whereby the airbag 120 has a greater thickness in the protruding portions 51.

Embodiment 6

Hereinafter, a side airbag device of Embodiment 6 of the present invention is described with reference to the drawings. Similar to Embodiment 4, the airbag of the side airbag device of Embodiment 6 includes an end on the vehicle upper side and the vehicle front side inclining toward the head of the occupant. However, the airbag of Embodiment 6 is different from that of Embodiment 4 in the point that the occupant side panel and the center side panel (non-occupant side panel) are connected via two strip connection panels connected to each other, not via one strip connection panel. In the present invention, the occupant side panel, the center side panel, and the connection panels may each be formed of one base fabric piece or may each be formed of some base fabric pieces connected. In terms of production efficiency of the airbag and the presence or absence of contact with the occupant, for example, some base fabric pieces are used in some cases.

The side airbag device of Embodiment 6 is similar to the side airbag device of Embodiment 1 except for the structure of the airbag. The same features therefore will not be elaborated upon here.

Figure 24:
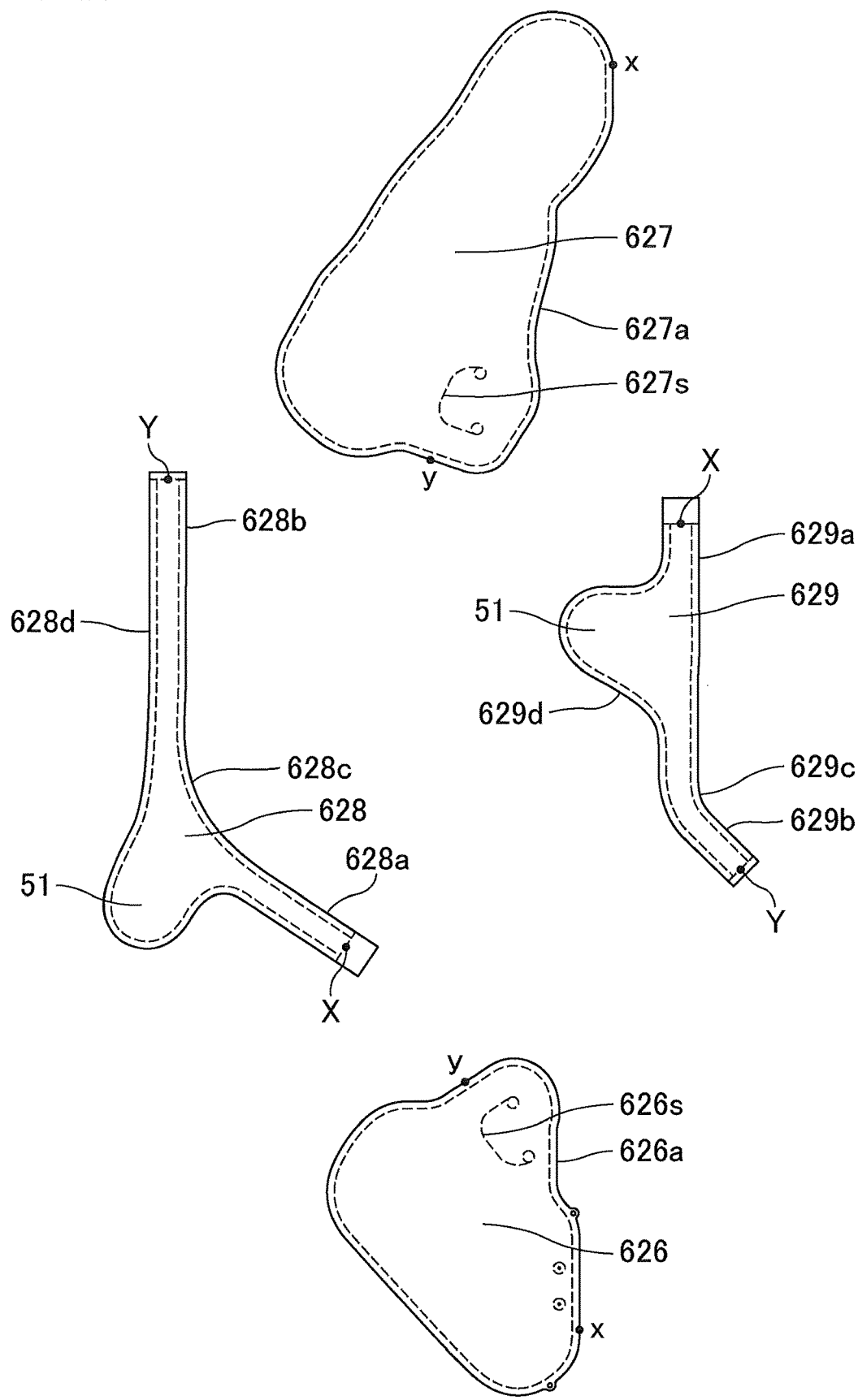
FIG. 24 is a schematic view showing the planar shapes of components defining an airbag of Embodiment 6.

FIG. 24 is a schematic view showing the planar shapes of components defining the airbag of Embodiment 6. As shown in FIG. 24, the airbag is assembled from an occupant side panel 626 to be disposed on the occupant side, a center side panel (non-occupant side panel) 627 to be disposed opposite the occupant side panel 626, and two strip connection panels 628 and 629 to connect a peripheral edge 626a of the occupant side panel 626 and a peripheral edge 627a of the center side panel 627. In other words, the occupant side panel 626 is connected to the strip connection panels 628 and 629 on one sides with peripheral edges 628a and 629a, and the center side panel 627 is connected to the strip connection panels 628 and 629 on the other sides with peripheral edges 628d and 629d. The occupant side panel 626, the center side panel 627, and the connection panels 628 and 629 are joined to one another along the joint lines indicated by the chain lines shown in FIG. 24. The connection panel 628 is to be disposed on the vehicle front side, and the connection panel 629 is to be disposed on the vehicle rear side. The connection panel 628 and the connection panel 629 are connected to form a strip connection panel.

In FIG. 24, the point x on the peripheral edge 626a of the occupant side panel 626 indicates the position to be connected to the lower-side end X of the strip connection panel 628 and to the lower-side end X of the strip connection panel 629. Similarly, the point x on the peripheral edge 627a of the center side panel 627 is to be connected to the lower-side end X of the strip connection panel 628 and to the lower-side end X of the strip connection panel 629. Also, the point y on the peripheral edge 626a of the occupant side panel 626 is to be connected to the upper-side end Y of the strip connection panel 628 and to the upper-side end Y of the strip connection panel 629. Similarly, the point y on the peripheral edge 627a of the center side panel 627 is to be connected to the upper-side end Y of the strip connection panel 628 and to the upper-side end Y of the strip connection panel 629.

The occupant side panel 626 and the center side panel 627, being connected with the two strip connection panels 628 and 629, are spaced from each other in the vehicle width direction. The center side panel 627 is to be disposed on the vehicle center side of the vehicle seat in the vehicle width direction. The occupant side panel 626 and the center side panel 627 may be directly connected in a part. For example, in order to reduce the content of the airbag, a sewing portion 626s of the occupant side panel 626 and a sewing portion 627s of the center side panel 627 may be connected.

The airbag of Embodiment 6 may further include as components a protection fabric piece and a reinforcing fabric piece.

The connection panels 628 and 629 include bend portions 628c and 629c, respectively, located between the first peripheral edge portion 628a to be connected to the peripheral edge 626a of the occupant side panel 626 defining the first inflation portion and the second peripheral edge portion 628b to be connected to the peripheral edge 626a of the occupant side panel 626 defining the second inflation portion 20b and between the first peripheral edge portion 629a to be connected to the peripheral edge 626a of the occupant side panel 626 defining the first inflation portion and the second peripheral edge portion 629b to be connected to the peripheral edge 626a of the occupant side panel 626 defining the second inflation portion 20b. Presence of the bend portions 628c and 629c in the connection panels 628 and 629 allows formation of the second inflation portion inclining toward the occupant with respect to the first inflation portion.

In Embodiment 6, the connection panels 628 and 629 are provided with the protruding portions 51 as shown in FIG. 24, and the airbag has a change in thickness in the protruding portions 51 of the connection panels 628 and 629. The connection panels 628 and 629 bridge the space between the occupant side panel 626 and the center side panel 627, whereby the airbag is formed into a three-dimensional box-like shape. Provision of the protruding portions 51 in part of the connection panels 628 and 629 changes the inflation shapes of the airbag at portions close to the occupant side panel 626 and the center side panel 627 connected to the protruding portions 51, whereby the airbag has a greater thickness in the protruding portions 51.

Figure 25:
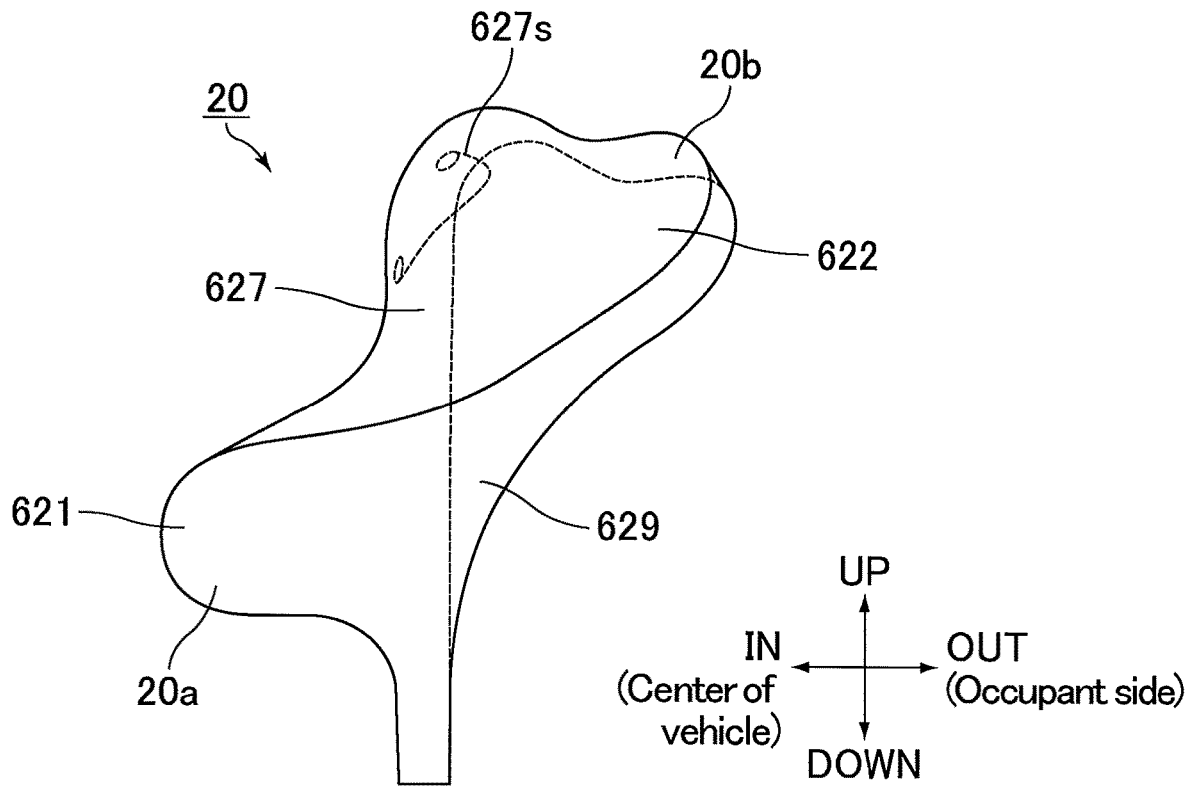
FIG. 25 is a schematic view of the airbag of Embodiment 6 viewed from the vehicle front side, showing a three-dimensional shape of the airbag in the inflated and deployed state.
Figure 26:
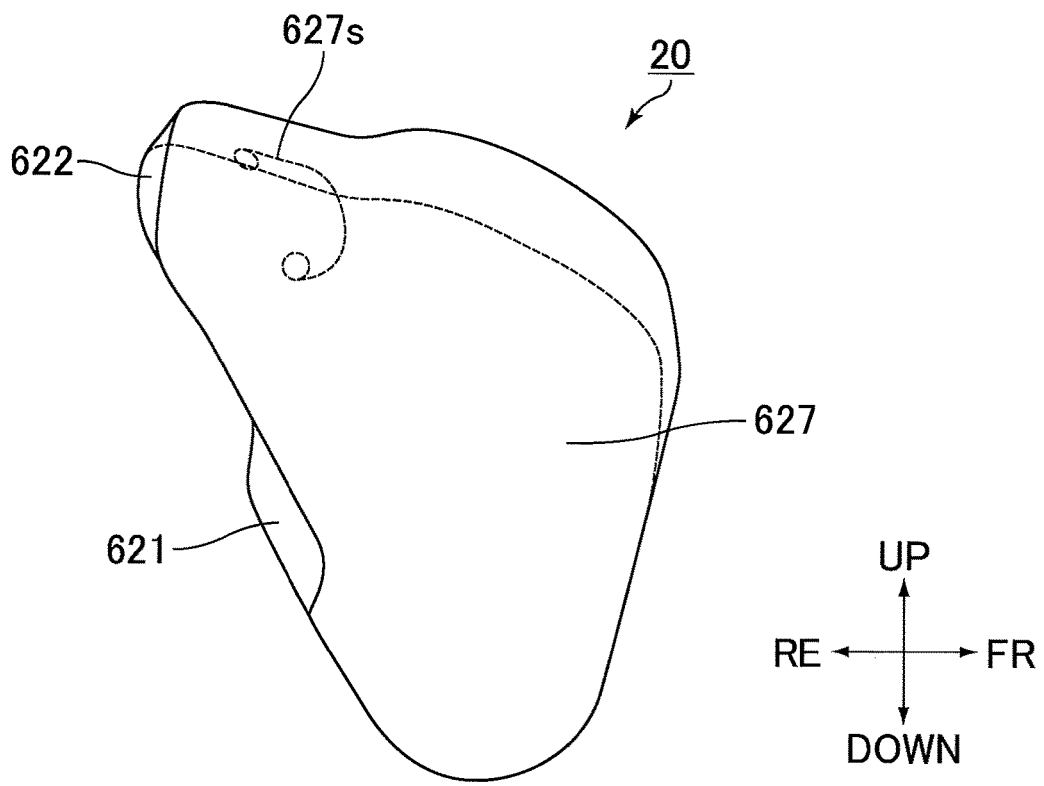
FIG. 26 is a schematic view of the airbag of Embodiment 6 viewed from the vehicle center side, showing a three-dimensional shape of the airbag in the inflated and deployed state.
Figure 27:
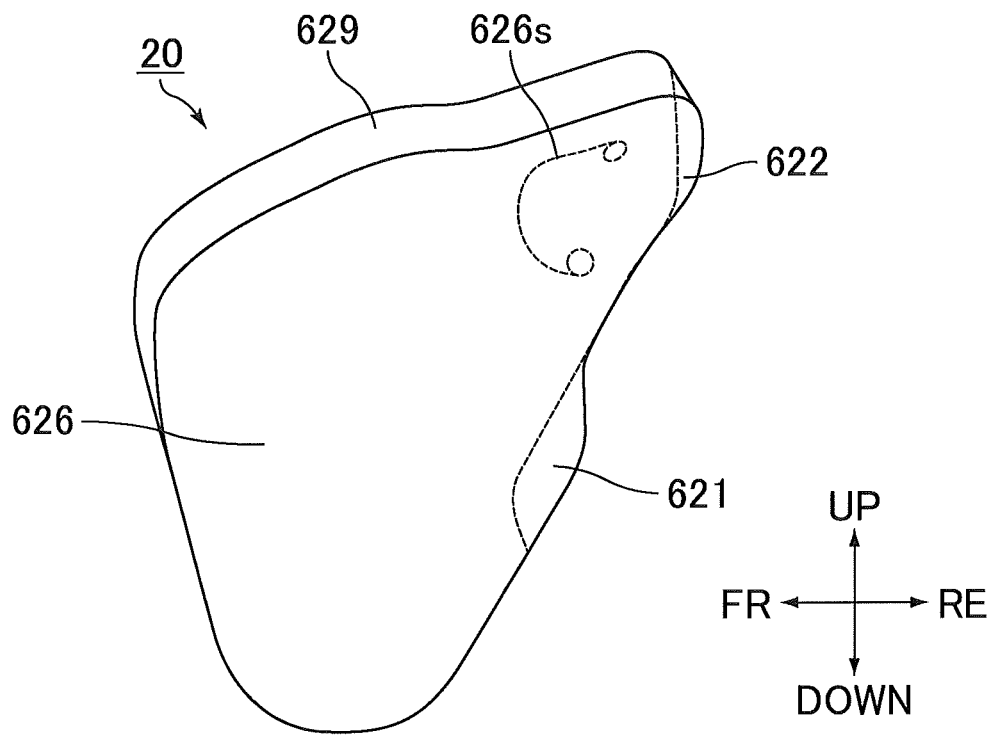
FIG. 27 is a schematic view of the airbag of Embodiment 6 viewed from the occupant side, showing a three-dimensional shape of the airbag in the inflated and deployed state.
Figure 28:
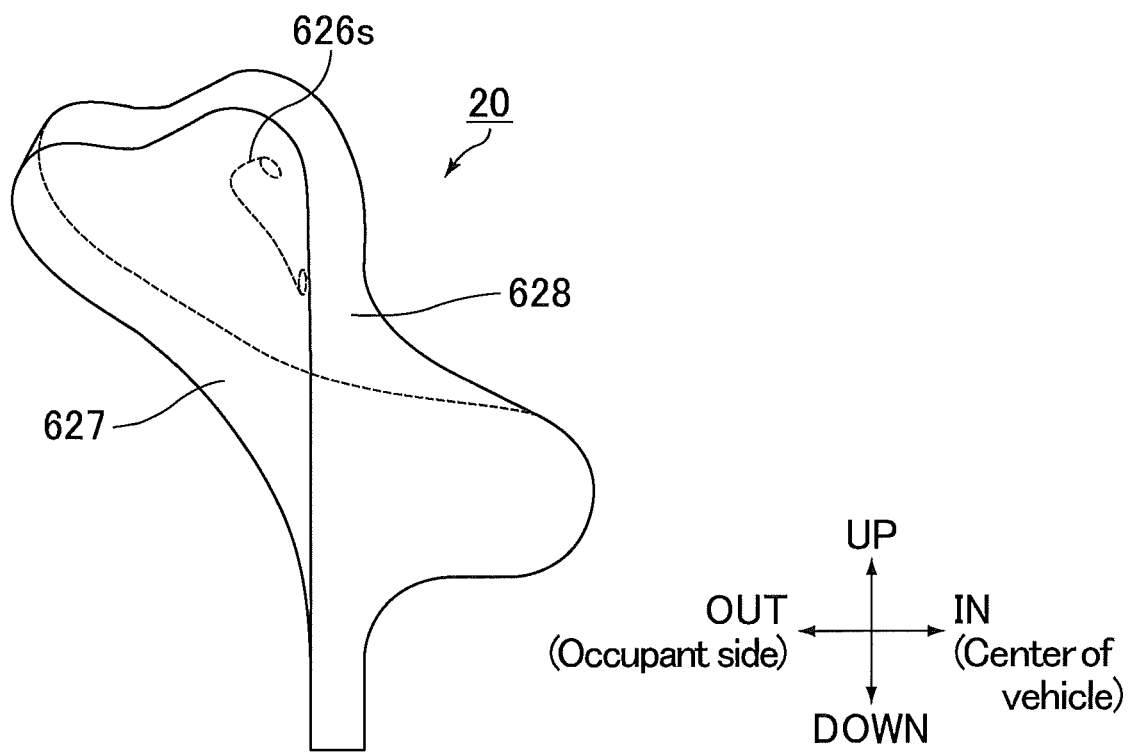
FIG. 28 is a schematic view of the airbag of Embodiment 6 viewed from the vehicle rear side, showing a three-dimensional shape of the airbag in the inflated and deployed state.

FIG. 25 is a schematic view of the airbag of Embodiment 6 viewed from the vehicle front side, showing a three-dimensional shape of the airbag in the inflated and deployed state. FIG. 26 is a schematic view of the airbag of Embodiment 6 viewed from the vehicle center side, showing a three-dimensional shape of the airbag in the inflated and deployed state. FIG. 27 is a schematic view of the airbag of Embodiment 6 viewed from the occupant side, showing a three-dimensional shape of the airbag in the inflated and deployed state. FIG. 28 is a schematic view of the airbag of Embodiment 6 viewed from the vehicle rear side, showing a three-dimensional shape of the airbag in the inflated and deployed state. The connection panels 628 and 629 connect the peripheral edge 626a of the occupant side panel 626 and the peripheral edge 627a of the center side panel 627 to bridge the space between the occupant side panel 626 and the center side panel 627, whereby the airbag 20 is formed into a three-dimensional box-like shape. Joining the occupant side panel 626, the center side panel 627, and the connection panels 628 and 629 having the shapes shown in FIG. 24 to one another can provide the airbag 20 that has a three-dimensional shape and includes the first inflation portion 20a and the second inflation portion 20b in the inflated and deployed state with a gas filled inside as shown in FIGS. 25, 26, 27, and 28. Accordingly, the airbag 20 that bends toward the occupant can be formed with a simple structure.

The side airbag device of Embodiment 6 can have a simple structure and can allow the airbag 20 to deploy in a desired position.

Also, the occupant side panel 626 includes a torso protection portion 621 that receives a lateral portion of the torso of the occupant and a head protection portion 622 that receives the head of the occupant. The head protection portion 622 is disposed from the lateral side of the head of the occupant to a position closer to the vehicle front side with respect to the head of the occupant and is inclined toward the front side of the head of the occupant. The head protection portion inclining toward the front side of the head can immediately receive the head of the occupant even when the occupant moves diagonally forward in case of a lateral collision of the vehicle.

The present invention is not limited to the contents described in Embodiments 1 to 6. The configurations described in Embodiments 1 to 6 may be deleted, supplemented, modified, or combined as appropriate within the spirit of the present invention.

Figure 29:
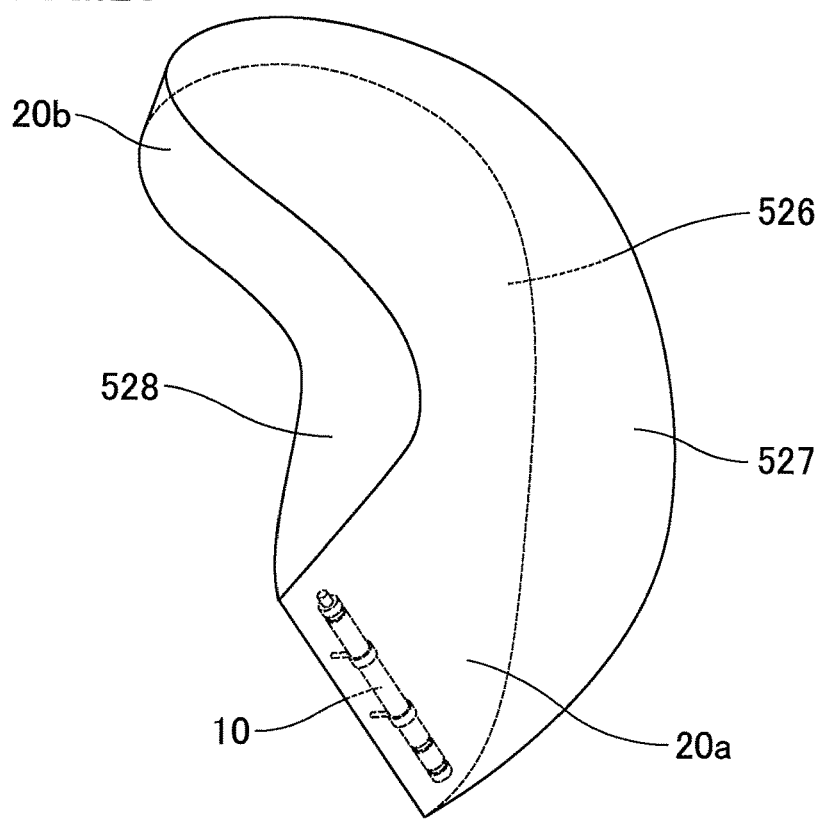
FIG. 29 is a schematic view showing an example of a three-dimensional shape of an airbag having a portion where an occupant side panel and a center side panel are directly connected.

In each airbag of the side airbag devices of Embodiments 1 to 6, one side peripheral edge of a strip connection panel is connected to the entire peripheral edge of an occupant side panel, and the other side peripheral edge of the strip connection panel is connected to the entire peripheral edge of a center side panel (non-occupant side panel). Thus, in Embodiments 1 to 6, the occupant side panel and the center side panel are indirectly connected with the connection panel in between. The airbag of the present invention may have any structure as long as a strip connection panel is connected to a peripheral edge of an occupant side panel and to a peripheral edge of a center side panel, and thus may have a portion where the occupant side panel and the center side panel are directly connected. FIG. 29 is a schematic view showing an example of a three-dimensional shape of an airbag having a portion where an occupant side panel and a center side panel are directly connected. The airbag shown in FIG. 29 has a great thickness in a portion where the peripheral edge of an occupant side panel 526 and the peripheral edge of a center side panel (non-occupant side panel) 527 are connected with a connection panel 528 in between. Meanwhile, a portion where the peripheral edge of the occupant side panel 526 and the peripheral edge of the center side panel 527 are directly connected has a small thickness. The portion where the panels are connected with the connection panel 528 has a great thickness to achieve high occupant-protection property, and thus is suitable for the second inflation portion inclining toward the occupant and also for the torso protection portion and the head protection portion. The portion where the panels are directly connected is suitable for the first inflation portion fixed to the seat and also for a portion that inflates and deploys in a relatively small space such as a space between an occupant and a console box.

The inflator in each of the side airbag devices of Embodiments 1 to 6 is fixed in the seatback. Still, the inflator may be fixed to the seating surface. When the inflator is fixed to the seating surface, the place and shape of the first inflation portion of the airbag of each of Embodiments 1 to 6 may be appropriately modified.

Embodiments 1 to 6 describe the case where the inflator 10 is activated when an obstacle collides with a vehicle sidewall opposing the vehicle sidewall 50 in the vehicle width direction. However, the inflator may be activated when an obstacle collides with the vehicle sidewall 50. In this case, when the occupant moves to the inner side in the vehicle width direction due to a cause such as swinging back after the occupant is restrained by a side airbag inflated and deployed on the outer side in the vehicle width direction of the occupant seated in the vehicle seat, the airbag can restrict the movement of the occupant to the inner side in the vehicle width direction while restraining the head of the occupant.

Figure 30:
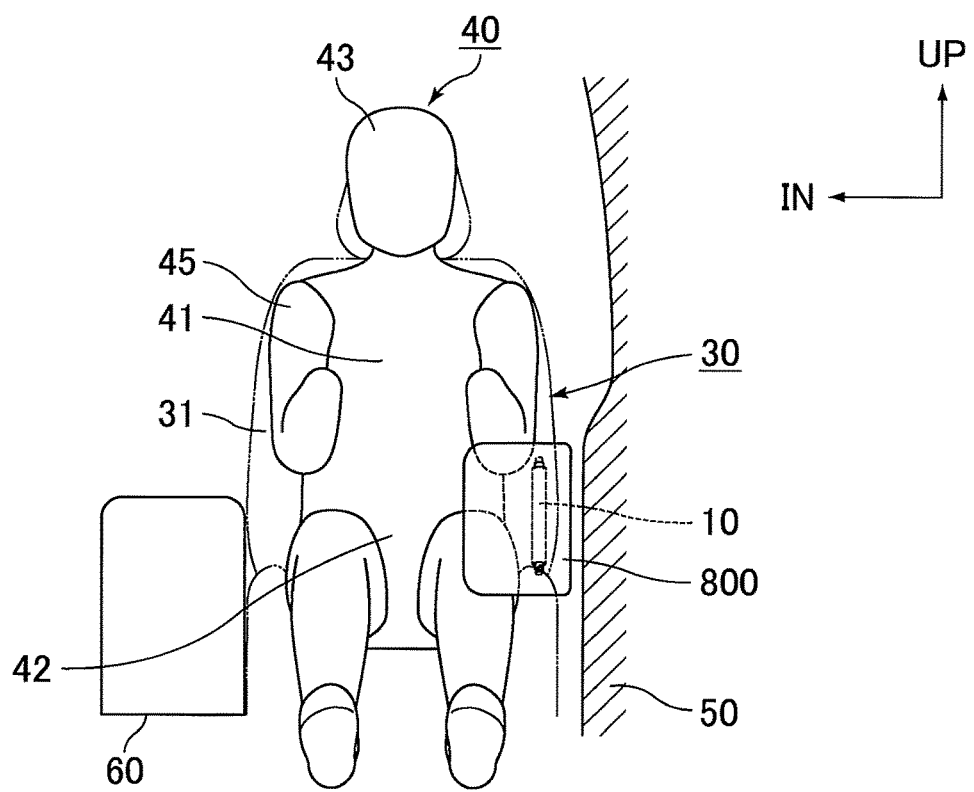
FIG. 30 is a schematic view showing a mounting position of a near side airbag, viewed from the vehicle front side.

Also, Embodiments 1 to 6 each describe an airbag of a side airbag device that inflates and deploys on the vehicle center side of an occupant seated in a vehicle seat. Still, the present invention is also applicable to an airbag that inflates and deploys on the vehicle outer side of an occupant seated in a vehicle seat (near side airbag: a side airbag on the side-wall side of a vehicle). FIG. 30 is a schematic view showing a mounting position of a near side airbag, viewed from the vehicle front side. When the vehicle side wall 50 has a collision with an obstacle, a near side airbag 800 immediately inflates and deploys to allow a torso protection portion to protect the torso 41, i.e., a portion lower than the shoulder 45, of the occupant 40. Also, a head protection portion inclines from the upper side of the torso protection portion toward the lateral side of the head 43 of the occupant 40, and thus can immediately come into contact with a lateral portion of the head 43 of the occupant 40 to protect the head 43.

What is claimed is:

1. A side airbag device comprising:
an inflator fixed in a vehicle seat and configured to generate a gas; and
an airbag that has a bag shape and is inflatable and deployable in a space beside an inner side in a vehicle width direction relative to the seat in response to the gas upon activation of the inflator,
the airbag in an inflated and deployed state including a first inflation portion fixed to the seat and a second inflation portion inclining toward a seat side with respect to the first inflation portion,
the airbag including an occupant side panel disposed on the seat side, a non-occupant side panel disposed opposite the occupant side panel, and a strip connection panel connecting a peripheral edge of the occupant side panel and a peripheral edge of the non-occupant side panel,
the non-occupant side panel being spaced from the occupant side panel in the vehicle width direction,
the connection panel including a bend portion between a first peripheral edge portion connected to a first part of the peripheral edge of the occupant side panel defining the first inflation portion and a second peripheral edge portion connected to a second part of the peripheral edge of the occupant side panel defining the second inflation portion, or in the second peripheral edge portion.

2. The side airbag device according to claim 1,
wherein the occupant side panel includes a torso protection portion and a head protection portion, the head protection portion disposed at a higher position than the torso protection portion, and
the second peripheral edge portion is connected to at least part of a periphery of the head protection portion.

3. The side airbag device according to claim 2,
wherein the connection panel is disposed on one or both of a vehicle front side and a vehicle rear side of the airbag, and
the head protection portion is inclined toward an upper portion of the seat side.

4. The side airbag device according to claim 2,
wherein the connection panel is disposed on one or both of a vehicle upper side and a vehicle lower side of the airbag, and
the head protection portion is inclined toward an upper portion of the seat side.

5. A side airbag device comprising:
an inflator fixed in a vehicle seat and configured to generate a gas; and
an airbag that has a bag shape, is inflatable and deployable in a space beside an inner side in a vehicle width direction relative to the seat in response to the gas upon activation of the inflator, and includes an occupant side panel disposed on a seat side, a non-occupant side panel disposed opposite the occupant side panel, and a strip connection panel connecting a peripheral edge of the occupant side panel and a peripheral edge of the non-occupant side panel,
one or both of a vehicle front side portion and a vehicle rear side portion of the non-occupant side panel being spaced from the occupant side panel in a vehicle width direction,
the connection panel being provided with a recessed portion or a protruding portion,
the airbag having a change in thickness in the recessed portion or the protruding portion of the connection panel.

* * * * *